United States Patent
Floeder et al.

(10) Patent No.: US 12,469,123 B2
(45) Date of Patent: Nov. 11, 2025

(54) INSPECTING SHEET GOODS USING DEEP LEARNING

(71) Applicant: 3M INNOVATIVE PROPERTIES COMPANY, St. Paul, MN (US)

(72) Inventors: Steven P. Floeder, Shoreview, MN (US); Jeffrey P. Adolf, Rochester, MN (US); Nathaniel S. Rowekamp, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 427 days.

(21) Appl. No.: 17/925,771

(22) PCT Filed: Jun. 1, 2021

(86) PCT No.: PCT/IB2021/054815
§ 371 (c)(1),
(2) Date: Nov. 16, 2022

(87) PCT Pub. No.: WO2021/255565
PCT Pub. Date: Dec. 23, 2021

(65) Prior Publication Data
US 2023/0169642 A1 Jun. 1, 2023

Related U.S. Application Data

(60) Provisional application No. 63/039,065, filed on Jun. 15, 2020.

(51) Int. Cl.
*G06T 7/00* (2017.01)
*G06V 10/82* (2022.01)

(52) U.S. Cl.
CPC .............. *G06T 7/001* (2013.01); *G06V 10/82* (2022.01); *G06T 2207/20084* (2013.01)

(58) Field of Classification Search
CPC ........... G06T 7/001; G06T 2207/20084; G06T 2207/10016; G06T 2207/20081;
(Continued)

(56) References Cited

U.S. PATENT DOCUMENTS 6,289,117 B1 9/2001 Li
7,158,917 B1 * 1/2007 Bickford ........... G06F 18/24155
702/181

(Continued)

FOREIGN PATENT DOCUMENTS

CN 109635856 A * 4/2019 .......... G06K 9/6256
CN 110189290 A 8/2019
(Continued)

OTHER PUBLICATIONS

Block, "Inspection of Imprint Defects in Stamped Metal Surfaces Using Deep Learning and Tracking", IEEE Transactions on Industrial Electronics, Apr. 9, 2020, vol. 68, No. 5, pp. 4498-4507.

(Continued)

*Primary Examiner* — Samir A Ahmed
(74) *Attorney, Agent, or Firm* — Sriram Srinivasan

(57) ABSTRACT

An inspection system includes an inspection device having at least one image capture device. The image capture device captures image data of a sheet part passing through the inspection device. A processing unit of the inspection device provides the image data representative of the sheet part to a plurality of neural networks, where each of the neural networks is trained to identify a corresponding defect in the sheet part and output data indicative of the presence of the corresponding defect. The processing unit determines a quality category of the sheet part based on the data indicative of the presence of the corresponding defect output by each corresponding neural network. The processing unit can further output the quality category of the sheet part to a (Continued)

sorter that can sort the sheet part based on the quality category.

19 Claims, 15 Drawing Sheets

(58) Field of Classification Search
CPC ........ G06T 7/0004; G06T 2207/30164; G06V 10/82; G01N 2021/8883; G01N 2021/8909
See application file for complete search history.

(56) References Cited

U.S. PATENT DOCUMENTS

| | | | |
|---|---|---|---|
| 7,333,650 B2 | 2/2008 | Yamamoto et al. | |
| 7,542,821 B2 | 6/2009 | Floeder et al. | |
| 8,103,085 B1 | 1/2012 | Zadeh | |
| 8,285,522 B1* | 10/2012 | Tryon, III | G06F 30/20 703/2 |
| 8,935,104 B2 | 1/2015 | Floeder et al. | |
| 10,223,615 B2 | 3/2019 | Ma et al. | |
| 2004/0002776 A1* | 1/2004 | Bickford | G05B 23/0254 700/52 |
| 2006/0191993 A1 | 8/2006 | Markham et al. | |
| 2013/0148987 A1 | 6/2013 | Arakawa | |
| 2019/0010005 A1 | 1/2019 | Ramakrishnan et al. | |
| 2019/0236772 A1 | 8/2019 | Cho et al. | |
| 2020/0233397 A1* | 7/2020 | Bello | G05B 19/4184 |
| 2020/0309718 A1* | 10/2020 | Buzaglo | G06T 7/0004 |
| 2021/0209414 A1* | 7/2021 | Tang | G06F 18/241 |

FOREIGN PATENT DOCUMENTS

| | | | | |
|---|---|---|---|---|
| WO | WO-9828490 A1 * | 7/1998 | | D21B 1/32 |
| WO | 2018045280 A1 | 3/2018 | | |
| WO | 2020079567 A1 | 4/2020 | | |
| WO | 2021090208 A1 | 5/2021 | | |

OTHER PUBLICATIONS

Fu, "Recognition of Surface Defects on Steel Sheet Using Transfer Learning", Cornell University Library/Computer Science/Computer Vision and Pattern Recognition, Sep. 2019, 12 Pages.

International Search Report for PCT Application No. PCT/IB2021/54815, mailed on Jul. 1, 2022, 2 pages.

* cited by examiner

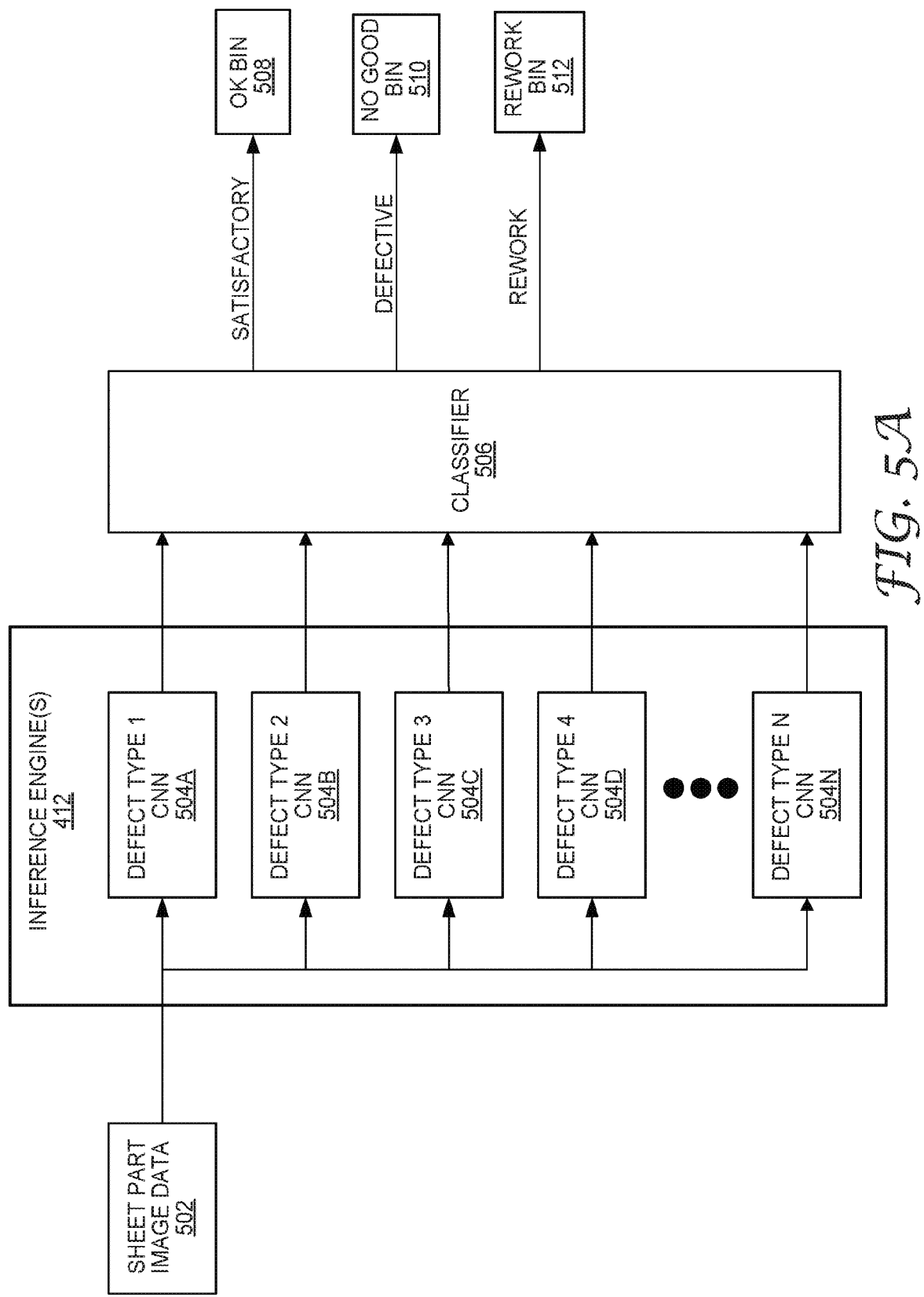

INSPECTING SHEET GOODS USING DEEP LEARNING

CROSS REFERENCE TO RELATED APPLICATIONS

This application is a national stage filing under 35 U.S.C. § 371 of PCT/IB2021/054815, filed Jun. 1, 2021, which claims the benefit of Provisional Application No. 63/039,065, filed Jun. 15, 2020, the disclosure of which is incorporated by reference in its/their entirety herein.

BACKGROUND

Sheet parts that are components of various manufactured goods are often made from various types of films (e.g., transparent polyester films). Manufacturing processes for making films typically involve manufacturing the films in a long continuous sheet, referred to as a web. The web itself is generally a material having a fixed width in one direction ("crossweb direction") and either a predetermined or indeterminate length in the orthogonal direction ("downweb direction"). During the various manufacturing processes used in making and handling the web, the web is conveyed along a longitudinal axis running in parallel to the length dimension of the web, and perpendicular to the width dimension of the web.

Optical film is one example of a manufactured film and is applied to a wide variety of consumer products. As an example, sheet parts converted from optical film may be in a screen assembly of an electronic device (e.g., a mobile phone, a television, a laptop computer, a desktop computer, or a tablet). A manufacturing facility may produce a plurality of similar sheet parts (e.g., optical film sheet parts) intended to be applied to particular consumer products. Often, sheet parts produced by a manufacturing facility need to be inspected for quality-compromising defects such that sheet parts determined to be defective can be discarded. In some examples, sheet parts are inspected by employees of the manufacturing facility. Additionally, or alternatively, sheet parts may be inspected using image processing techniques configured to automatically identify defects.

SUMMARY

In general, this disclosure describes techniques for inspecting sheet parts for defects. More specifically, this disclosure describes example techniques for detecting defects within a sheet part based on image data of the sheet part.

As described herein, one or more image capture devices captures image data of a sheet part as the part moves through an inspection device. A processing unit of the inspection device receives the image data, pre-processes the image data and provides the image data to a set of convolutional neural networks (CNNs), where each CNN may be uniquely trained to detect a different type of defect in the part. The output of each CNN may comprise data indicative of whether the defect detected by the CNN is present in the image data and, if so, a location of the defect that is spatially correlated to the sheet part. A classifier of the inspection device is configured to receive the output data from each CNN and classify the sheet part into a quality category based on, for example the defects detected by the CNNs based on the image data. In some aspects, the inspection device may be configured with data defining one or more rules, each of the rules specifying threshold levels for each type of defect permitted for the various quality categories. The classifier can determine a particular one of the quality categories to which to assign a given sheet part based on application of the rules to the outputs of the set of CNNs for the different types of defects detected by the CNNs. In some aspects, the set of rules can be defined so as to classify the sheet part based on the various combinations and/or correlation of the number of defects detected by the CNNs in the image data for the different types of defects. In some aspects, the inspection device may provide a multi-stage, machine-learning architecture in which a second set of one or more neural networks are trained to assign quality categories to sheet parts based on the output of the first set of CNNs indicative of the number of defects in the sheet part for the various different types of defects.

In the various examples set forth herein, the inspection device may take one or more actions based on the determinations of the trained CNNs. For example, the quality category can be used to determine whether the sheet part is satisfactory, defective, or needs rework. Further, the quality category may be used to sort parts suitable for different customers, some requiring very high quality and some willing to accept slightly lower quality. The quality category can be used to sort the sheet part into a bin corresponding to the quality category.

The techniques of this disclosure may provide at least one technical advantage. For example, the inspection device may be able to detect defects having low contrast and/or low frequency with respect to the sheet part that may not be detectable in current sheet goods inspection systems. A practical application of the techniques described herein is an inspection device that can classify low contrast, low frequency defects in sheet parts.

In one embodiment, a system for determining a quality category of each of a plurality of sheet parts produced by a manufacturing facility includes an inspection device comprising at least one image capture device, the at least one image capture device configured to capture image data representative of a sheet part of the plurality of sheet parts; and a processing unit having one or more processors, the one or more processors to execute instructions that cause the processing unit to: provide the image data representative of the sheet part to a first set of a plurality of neural networks, each of the neural networks trained to identify a corresponding defect in the sheet part and output data indicative of the presence of the corresponding defect, determine, data indicative of a quality category of the sheet part based on the data indicative of the presence of the corresponding defect output by each corresponding neural network, and output the data indicative of the quality category of the sheet part.

In another embodiment, an inspection device for determining a quality category for a web material produced by a manufacturing facility includes at least one image capture device, the at least one image capture device configured to capture image data representative of the web material; a position controller configured to obtain position data along the web material; and a processing unit configured to: provide the image data representative of the web material to each of a plurality of neural networks, each of the neural networks trained to identify a corresponding defect in the sheet part and output data indicative of the presence of the corresponding defect, and output the data indicative of the presence of the corresponding defect and the position data in association with the data indicative of the presence of the corresponding defect.

In another embodiment, a method includes receiving, from at least one image capture device image data representative of a sheet part of a plurality of sheet parts passing through an inspection device; providing the image data representative of the sheet part to a plurality of neural networks, each of the neural networks trained to identify a corresponding defect in the sheet part based on the image data representative of the sheet part and output data indicative of the presence of the corresponding defect, determining data indicative of a quality category for the sheet part based on the data indicative of the presence of the corresponding defect output by each corresponding neural network, and outputting the data indicative of the quality category of the sheet part.

The details of at least one example of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 5A-5E are block diagrams showing example configurations of machine learning components of a sheet part inspection system, in accordance with at least one example technique described in this disclosure.

DETAILED DESCRIPTION

Systems and techniques are described for automatically determining a quality of sheet parts created by a manufacturing facility to enable taking actions on (e.g., sorting) the plurality of sheet parts according to quality, even in high-speed production environments. Accuracy is important while determining the quality of the plurality of sheet parts, as erroneous quality determinations may cause a high-quality sheet part to be discarded or may cause a low-quality sheet part to be shipped for consumption. Consequently, a well-performing inspection system with the technical advantages discussed herein may increase yields and efficiency of the manufacturing facility and increase the quality of sheet parts produced by the manufacturing facility. The techniques described herein may enable efficient and accurate determination of a quality category for sheet parts.

Figure 1:
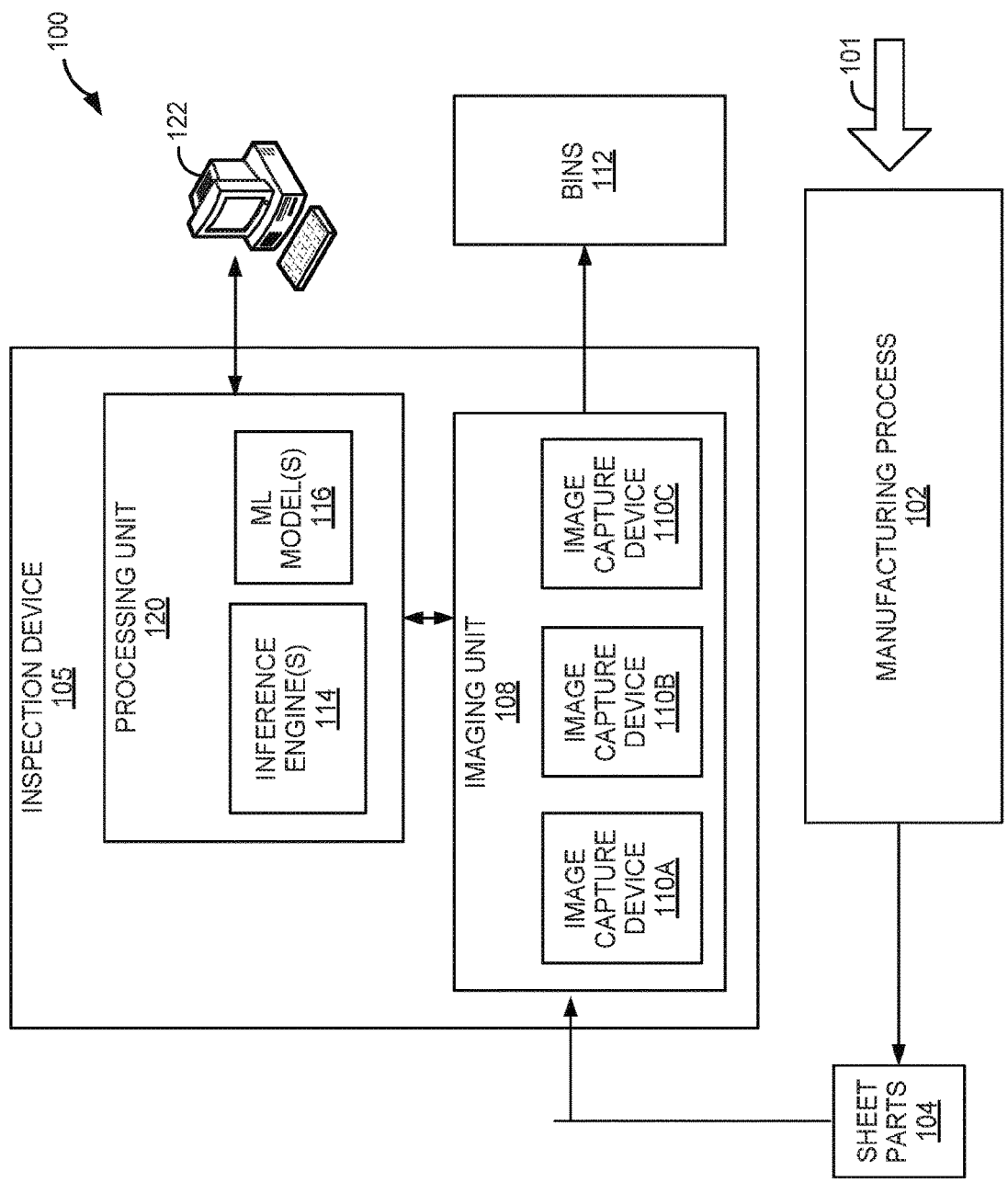
FIG. 1 is a block diagram illustrating a system for manufacturing a plurality of sheet parts, and for imaging and inspecting the plurality of sheet parts for defects, in accordance with at least one example technique described in this disclosure.

FIG. 1 is a block diagram illustrating a system for manufacturing a plurality of sheet parts, and for imaging and inspecting the plurality of sheet parts for defects, in accordance with at least one example technique described in this disclosure. In the example illustrated in FIG. 1, system 100 includes inputs 101, manufacturing process 102, sheet parts 104, inspection device 105, imaging unit 108, one or more image capture devices 110A-110C (collectively, "image capture devices 110"), bins 112, processing unit 120, and user interface 122.

Manufacturing process 102 as shown in FIG. 1 receives various inputs 101 (e.g., material, energy, people, and machinery) and produces an output including a plurality of sheet parts (e.g., sheet parts 104). Manufacturing process 102 is not limited to any particular type or form of manufacturing and is illustrative of any type of manufacturing process operable to produce sheet parts. In some examples, inputs 101 include a long continuous sheet of a roll good product (e.g., a polyester film (e.g., an optical film)). Manufacturing process 102 may include partitioning individual portions of the long continuous sheet to create sheet parts 104. For example, sheet parts 104 may include pieces cut from the long continuous sheet. In some examples, sheet parts 104 include pieces of the long continuous sheet cut in the shape of an object (e.g., a mobile device, a laptop computer, a desktop computer, a television, or a window). Once produced by manufacturing process 102, sheet parts 104 may be applied to a surface of the respective object.

Sheet parts 104 may be substantially similar in shape, material composition, and thickness such that each sheet part of the plurality of sheet parts appears to be alike. In some embodiments, each sheet part of sheet parts 104 comprises a single layer of transparent or semi-transparent material or may include a plurality of layers of materials. Sheet parts 104 may comprise transparent or semi-transparent material intended to provide particular levels of light transmission, generally through the thickness dimension of sheet parts 104, for a particular wavelength of light or for a range of wavelengths of light. Sheet parts 104 may have various requirements related to the flatness of the top and/or bottom surfaces of the sheet parts, and/or related to the lack of defects.

During the manufacturing process 102, sheet parts 104 may accrue a variety of defects. In some examples, defects include particles, scuffs, scratches, dents, streaks, or impressions. A presence of defects may determine a quality of a sheet part of sheet parts 104. Some defects are miniscule in size and severity, and do not noticeably affect the quality of a sheet part. However, other defects may be more severe, and may negatively affect the quality of the sheet part. Thresholds may be established for each type of defect. A sheet part may be classified as defective if the number of defects for a type of defect is greater than a primary threshold level for that type of defect. Further, a sheet part may be classified as defective if a certain type or a combination of certain types of defects are detected in the sheet part. In some cases, a sheet part may be classified into a "rework" category if the number of defects for a particular type detected in the sheet part is greater than a secondary threshold level of defects for that type and less than the primary threshold level of defects is detected, or if a certain type or a combination of certain types of defects are detected in the sheet part where the type or combination of types of defects does not render the sheet part unusable. Additionally, or alternatively, a sheet part may be classified as satisfactory if less than the secondary threshold level of defects are detected in the sheet part for each type of defect, or in the absence of certain types of defects or combinations of certain types of defects. Thus, sheet parts classified as needing rework may possess a higher quality level than defective sheet parts and a lower quality level than satisfactory sheet parts.

System 100 may manufacture and inspect sheet parts 104 in an assembly line. In other words, after manufacturing process 102 creates sheet parts 104, the sheet parts may travel through inspection device 105. Subsequently, sheet parts 104 may be sorted into bins 112. Sheet parts 104 may continuously cycle through system 100 such that additional sheet parts enter inspection device 105 as newly inspected sheet parts exit inspection device 105 into bins 112. In some examples, a moving belt (e.g., a conveyor belt) continuously transports sheet parts 104 from an endpoint of manufacturing process 102 through inspection device 105 to bins 112.

Inspection device 105 may include imaging unit 108. In some examples, inspection device 105 includes an entry zone (not shown) for sheet parts 104 to enter inspection device 105. In some examples, the entry zone of inspection device 105 automatically receives a sheet part from a collection of sheet parts 104. For example, the entry zone of inspection device 105 may include a portion of a moving belt that transports sheet parts 104 from manufacturing process 102, enabling sheet parts 104 to enter inspection device 105. In other examples, sheet parts 104 may be assembled in a stack after the sheet parts are created by manufacturing process 102, and individual sheet parts of the stack of sheet parts may automatically and continuously dispense onto the entry zone of inspection device 105. Additionally, or alternatively, inspection device 105 may include a selection member (not shown) configured to select an individual sheet part from the stack of sheet parts 104 and place the individual sheet part onto the entry zone of inspection device 105. In other examples, a device operator may manually place sheet parts 104 on the entry zone.

Imaging unit 108 may include one or more image capture devices 110. Image capture devices 110 may be cameras or other components configured to capture image data representative of sheet parts 104 within imaging unit 108. In other words, the image data captures a visual representation of an environment, such as sheet parts 104 within imaging unit 108. Image capture devices 110 may include components capable of capturing image data, such as a video recorder, an infrared camera, a CCD (Charge Coupled Device) array, or a laser scanner.

In some examples, image capture devices 110 can be conventional imaging devices that are capable of reading some or all of a moving sheet part and providing output in the form of a digital data stream. Image capture devices 110 may capture images corresponding to a sheet part of sheet parts 104. Image capture devices 110 may be cameras that directly provide a digital data stream or an analog camera with an additional analog to digital converter. Additionally, image capture devices 110 may include other sensors, such as, for example, laser scanners and linescan cameras.

In some examples, there can be one image capture device (e.g., image capture device 110A) that can be used to capture image data. In some examples, there can be multiple image capture devices (e.g., image capture devices 110A-110C) that each capture image data for a sheet part. In some aspects, the cameras may capture image data for a sheet part from different angles or different views. In such examples, an acquisition computer (not shown in FIG. 1) or processing unit 120 can create composite image data from the image data of each of the image capture devices 110. As used herein, image data can include image data captured from a single image capture device and composite image data of a sheet part captured from multiple image capture devices.

After imaging unit 108 captures an image of a sheet part, imaging unit 108 may output image data to processing unit 120. Processing unit 120 may be configured to assess a quality of the sheet part. For example, processing unit 120 can include one or more inference engines 114 that can use machine learning models 116 to detect and categorize defects in sheet parts using the image data for the sheet part. The machine learning models 116 can define layers of multiple convolutional neural networks (CNNs), where each CNN can be trained to detect a different category of defect based on the image data for the sheet part, and output defect data indicative of defects in the sheet part detected in the image data. Processing unit 120 can use the defect data to determine data indicative of a quality category for the sheet part. For example, processing unit 120 may determine data indicative of a quality category for the sheet part, where the quality category indicates that the sheet part is satisfactory, defective, or needing rework. Processing unit 120 may determine other quality categories in addition to, or instead of satisfactory, defective, or needing rework.

In some examples, user interface 122 allows a user to control system 100. User interface 122 can include any combination of a display screen, a touchscreen, buttons, speaker inputs, or speaker outputs. In some examples, user interface 122 is configured to power on or power off any combination of the elements of system 100 and provide configuration information for processing unit 120.

Inspection device 105 may receive information indicative of a determined quality category of a sheet part and perform one or more operations based on the information indicative of the quality category. In some aspects, in response to receiving the information indicative of the quality category, inspection device 105 may sort the sheet part in one of bins 112 based on the data indicative of the quality category.

Bins 112 may be configured to receive sheet parts classified into at least one quality category. In some aspects, there may be three quality categories, a satisfactory category (also referred to as an "OK" category), a defective category (also referred to as a "no good" category), and a rework category, as determined by processing unit 120. In some examples, bins 112 include at least one bin corresponding to each quality category. For example, bins 112 may include an "OK" bin, a "no good" bin, and a "rework bin." An output zone (not shown) of inspection device 105 may route a classified sheet part into a respective bin. Sheet parts that are classified as defective by processing unit 120 are sorted into the no-good bin. The defective sheet parts may be discarded, recycled, or reused to manufacture another product. Additionally, in some examples, bins 112 include an OK bin configured to accept sheet parts categorized as satisfactory. Sheet parts sorted into the OK bin may be shipped from the manufacturing facility, sold, and consumed. Bins 112 may also include a rework bin. Sheet parts sorted into the rework bin may include a lesser level of defects than the sheet parts sorted into the no-good bin and a greater level of defects than the sheet parts sorted into the OK bin. After a sheet part is sorted into the rework bin, it may be repaired (e.g., reworked) to remove defects. After a sheet part is reworked, processing unit 120 may classify the reworked sheet part as having satisfactory quality. Thus, the rework category may allow system 100 to salvage sheet parts that would otherwise be classified as defective.

In some examples, the output zone of inspection device 105 automatically routes a classified sheet part into a respective bin. Additionally, or alternatively, system 100 may indicate a classification of a sheet part and a device operator may manually sort the sheet part into a respective bin. In the examples in which the output zone automatically sorts sheet parts into respective bins 112, inspection device 105 may include a set of diverging tracks at the output zone, where each track of the diverging tracks leads to a bin of the plurality of bins 112.

Figure 2:
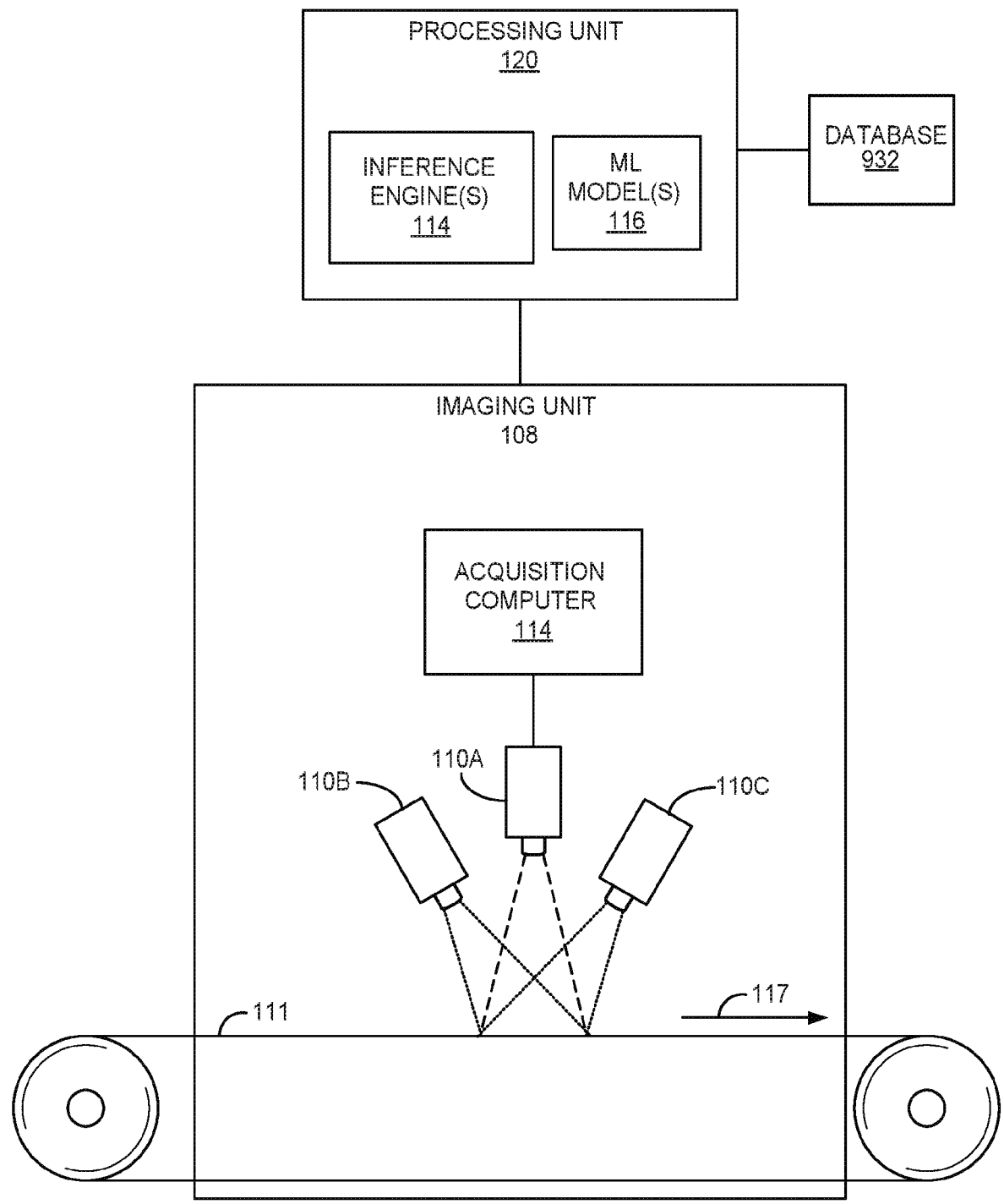
FIG. 2 is a block diagram illustrating additional details of the system of FIG. 1, in accordance with at least one example technique described in this disclosure.

FIG. 2 is a block diagram illustrating additional details of system 100 of FIG. 1, in accordance with at least one example technique described in this disclosure. Shown in FIG. 2 are imaging unit 108, image capture devices 110, moving belt 111, acquisition computer 214, and processing unit 120.

Image capture devices 110 can be arranged to inspect sheet parts continuously advanced past the image capture devices. In the example embodiment of inspection system 100 as shown in FIG. 2, at least one sheet part of sheet parts 104 (FIG. 1) is positioned on moving belt 111. Image capture devices 110 can be positioned in proximity to moving belt 111 carrying sheet parts so image capture devices 110 may capture a reference image of each sheet part that advances through imaging unit 108. Although three image capture devices 110 are shown in FIG. 2, the number of image capture devices that may be included in system 100 is not limited to a particular number of devices and there may be fewer or more than three devices.

During the imaging process that may be performed using system 100, moving belt 111 may be advanced in a direction generally indicated by arrow 117. In some embodiments, moving belt 111 may support and advance sheet parts (not shown) as they are provided by a manufacturing process, such as manufacturing process 102 (FIG. 1). In other embodiments, the imaging of sheet parts as illustrated in FIG. 2 is performed at some point in time after the sheet parts have been manufactured and stored. In some embodiments, the sheet parts may be in the form of individual sheet parts having both a pre-defined width and length, and that are advanced through imaging unit 108 that includes image capture devices 110 so that the image capture devices 110 can capture at least one reference image of a sheet part as it passes through imaging unit 108.

Image capture devices 110 are not limited to any particular type of image capture devices and may be conventional imaging devices that are capable of imaging the plurality of sheet parts as moving belt 111 is advanced past the image capture devices 110, and provide outputs in the form of an electronic signal, such as a digital data stream of image data. In some example implementations, one or more of image capture devices 110 can be a line-scan camera. In other example implementations, one or more of image capture devices 110 can be an area scan camera. In other example implementations, one or more of image capture devices 110 may be sensitive in the visible spectrum, UV spectrum, IR spectrum, or combinations thereof. In some example implementations having more than one image capture device to capture image data of a sheet part, each of image capture devices 110 is a same type of image capture device. In other example implementations having more than one image capture device to capture image data of a sheet part, at least one image capture device is a different type of image capture device compared to another image capture device present in system 100.

As noted above, there may be one image capture device used to capture image data for a sheet part or there may be a set of image capture devices used to capture image data for a sheet part. In the example illustrated in FIG. 2, image capture device 110A, and optionally, image capture devices 110B and 110C capture image data for a sheet part. In some example implementations, image data for multiple sheet parts may be captured substantially in parallel. For example, there may be multiple sets of multiple image capture devices, each set for obtaining image data for a sheet part as the sheet parts pass through imaging unit 108.

Image capture devices 110 may provide electrical output signals representative of a sensed image of a sheet part to an acquisition computer 214. Acquisition computer 214 can be coupled to processing unit 120 and provide an output representative of image data captured by the image capture devices 110 to processing unit 120. In other embodiments, image capture devices 110 may provide a digital data stream and/or an analog signal representative of an image captured by the image capture devices 110 directly to a computing device, such as processing unit 120, for further processing by processing circuitry included in processing unit 120. Each set of image capture devices 110 may have its own acquisition computer 214 or sets of image capture devices may be associated with the same acquisition computer.

Processing circuitry of processing unit 120 can process image streams including image data provided from acquisition computer 214, or in the alternative directly from image capture devices 110, to generate images of sheet parts advancing through imaging unit 108 on moving belt 111. Processing unit 120 can analyze the image data using multiple convolutional neural networks (CNNs), where each CNN is configured to determine if a particular defect such as a dent, wrinkle, bubble, wave, or other low contrast and/or low frequency defect is detected in the image data for a sheet part. For example, a low contrast defect may be one in which the variation in intensity values is within normal product intensity variation. That is, there is no substantial intensity variation difference when comparing defect areas to normal product areas. In such examples, the defective area may only be recognized as noticeable patterns within the normal intensity variations. In addition, the low frequency defects may be relatively large with respect to the pixel imaging resolution of the image. For example, typical imaging resolution may be 5 um per pixel to 50 um per pixel. The low frequency defects may be 5 mm or greater in size. Processing unit 120 may process the output of each CNN to determine a quality characteristic of the sheet part.

A user interface (e.g., user interface 122 of FIG. 1) may be coupled to processing unit 120 and may be used to provide graphical displays that are indicative of the results of the analysis of the plurality of sets of reference images. For example, the user interface may indicate the determined quality of each sheet part that advances through imaging unit 108.

Figure 3:
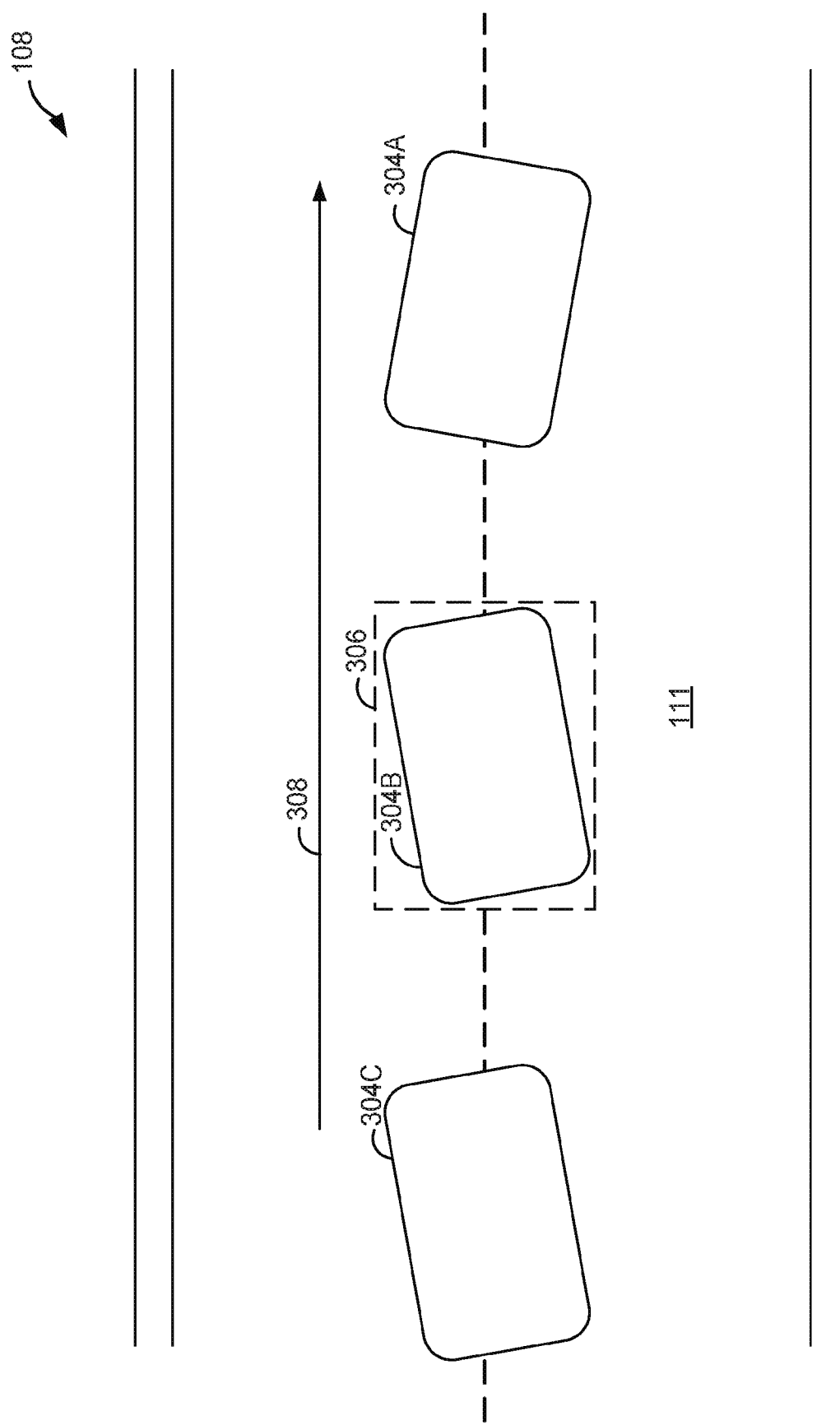
FIG. 3 is a block diagram illustrating a top perspective view of an example imaging unit of the system of FIG. 1, in accordance with at least one example technique described in this disclosure.

FIG. 3 is a block diagram illustrating a top perspective view of imaging unit 108 of the system of FIG. 1, in accordance with at least one example technique described in this disclosure. As shown in FIG. 3, the perspective view of imaging unit 108 may include moving belt 111 and sheet parts 304A-304C (collectively, "sheet parts 304").

Sheet parts 304 may be illustrated from the perspective of an image capture device 110 of FIGS. 1 and 2. In other words, FIG. 3 depicts sheet parts 304 from a "bird's eye" view. Moving belt 111 may advance in the direction indicated by arrow 308, carrying sheet parts 304 through image capture region 306. Image capture region 306 may correspond to image capture devices 110 of FIG. 1 and represents the field of view of the image capture devices 110. For example, image capture region 306 may represent an area that image capture devices 110 capture. As such, each of sheet parts 304 passes through image capture region 306, and image capture devices 110 capture image data corresponding to each sheet part that advances through imaging unit 108 on moving belt 111. In the example shown in FIG. 3, there is one image capture region 306 corresponding to a single set of one or more image capture devices. As noted above, in some example implementations, there may be multiple sets of image capture devices 110 to process sheet parts substantially in parallel. In such example embodiments, there can be multiple image capture regions 306, each corresponding to a set of image capture devices 110.

Figure 4:
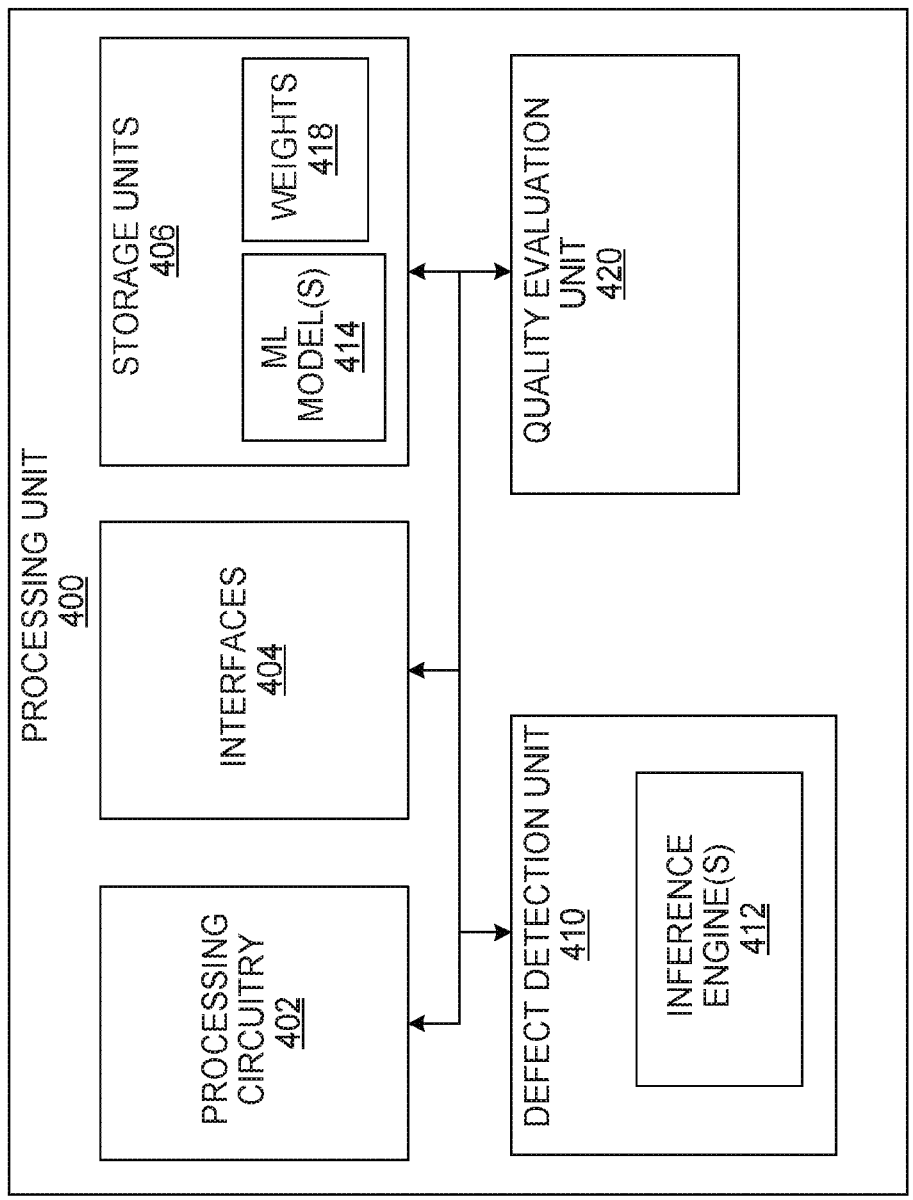
FIG. 4 is a block diagram illustrating an example processing unit, in accordance with at least one example technique described in this disclosure.

FIG. 4 is a block diagram illustrating an example processing unit 400, in accordance with at least one example technique described in this disclosure. Processing unit 400 may be an example or alternative implementation of processing unit 120 of system 100 of FIG. 1. The architecture of processing unit 400 illustrated in FIG. 4 is shown for example purposes only. Processing unit 400 should not be limited to the illustrated example architecture. In other examples, processing unit 400 may be configured in a variety of ways. In the example illustrated in FIG. 4, processing unit 400 includes a defect detection unit 410 configured to detect one or more types of defects in a sheet part based on an analysis of image data for the sheet part. Defect detection unit 410 can include one or more inference engines 412 configured to process the image data for the sheet part using a machine learning model 414 and provide defect detection data as output. Processing unit 400 further includes a quality evaluation unit 420 configured to assess the quality of the sheet part based on defects (if any) detected by inference engine 410.

In some aspects, machine learning model 414 can include multiple CNNs, trained to detect a different type of defect. Inference engine 412 can receive image data for a sheet part and pass the image data through the multiple CNNs. The output of each CNN can be data indicating whether the type of defect detected by the CNN is present in the image data. Quality evaluation unit 420 can receive the data indicating whether each type of defect detected by the respective CNNs is present in the image data and apply a weight from weights 418 to the data for each defect type to produce data indicating a quality category for the sheet part. As noted above, in some aspects, the quality categories can include satisfactory, defective, or needing rework.

Processing unit 400 may be implemented as any suitable computing system, (e.g., at least one server computer, workstation, mainframe, appliance, cloud computing system, and/or other computing system) that may be capable of performing operations and/or functions described in accordance with at least one aspect of the present disclosure. In some examples, processing unit 400 is electrically coupled to inspection device 105 of FIG. 1. In other examples, Processing unit 400 represents a cloud computing system, server farm, and/or server cluster (or portion thereof) configured to connect with system 100 via a wired or wireless connection. In other examples, processing unit 400 may represent or be implemented through at least one virtualized compute instance (e.g., virtual machines or containers) of a data center, cloud computing system, server farm, and/or server cluster. In some examples, processing unit 400 includes at least one computing device, each computing device having a memory and at least one processor.

As shown in the example of FIG. 4, processing unit 400 includes processing circuitry 402, at least one interface 404, and at least one storage unit 406. Defect detection unit 410, inference engine(s) 412, and quality evaluation unit 420 may be implemented as program instructions and/or data stored in storage units 406 and executable by processing circuitry 402. Storage unit 406 may store machine learning models 414 and weights 418 associated with the outputs of the machine learning models. Storage unit 406 of processing unit 400 may also store an operating system (not shown) executable by processing circuitry 402 to control the operation of components of processing unit 400. The components, units or modules of processing unit 400 can be coupled (physically, communicatively, and/or operatively) using communication channels for inter-component communications. In some examples, the communication channels include a system bus, a network connection, an inter-process communication data structure, or any other method for communicating data.

Processing circuitry 402, in one example, may include at least one processor that is configured to implement functionality and/or process instructions for execution within processing unit 400. For example, processing circuitry 402 may be capable of processing instructions stored by storage units 406. Processing circuitry 402, may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

There may be multiple instances of processing circuitry 402 within processing unit 400 to facilitate processing inspection operations in parallel. The multiple instances may be of the same type, e.g., a multiprocessor system or a multicore processor. The multiple instances may be of different types, e.g., a multicore processor with associated multiple graphics processor units (GPUs).

Processing unit 400 may utilize interfaces 404 to communicate with external systems via at least one network. In some examples, interfaces 404 include an electrical interface configured to electrically couple processing unit 400 to inspection device 105. In other examples, interfaces 404 may be network interfaces (e.g., Ethernet interfaces, optical transceivers, radio frequency (RF) transceivers, Wi-Fi, or via use of wireless technology under the trade "BLUETOOTH", telephony interfaces, or any other type of devices that can send and receive information. In some examples, processing unit 400 utilizes interfaces 404 to wirelessly communicate with external systems (e.g., inspection device 105 of FIG. 1).

Storage units 406 may be configured to store information within processing unit 400 during operation. Storage units 406 may include a computer-readable storage medium or computer-readable storage device. In some examples, storage units 406 include at least a short-term memory or a long-term memory. Storage units 406 may include, for example, random access memories (RAM), dynamic random access memories (DRAM), static random access memories (SRAM), magnetic discs, optical discs, flash memories, magnetic discs, optical discs, flash memories, or forms of electrically programmable memories (EPROM) or electrically erasable and programmable memories (EEPROM). In some examples, storage units 406 are used to store program instructions for execution by processing circuitry 402. Storage units 406 may be used by software or applications running on processing unit 400 to temporarily store information during program execution.

Figure 5B:
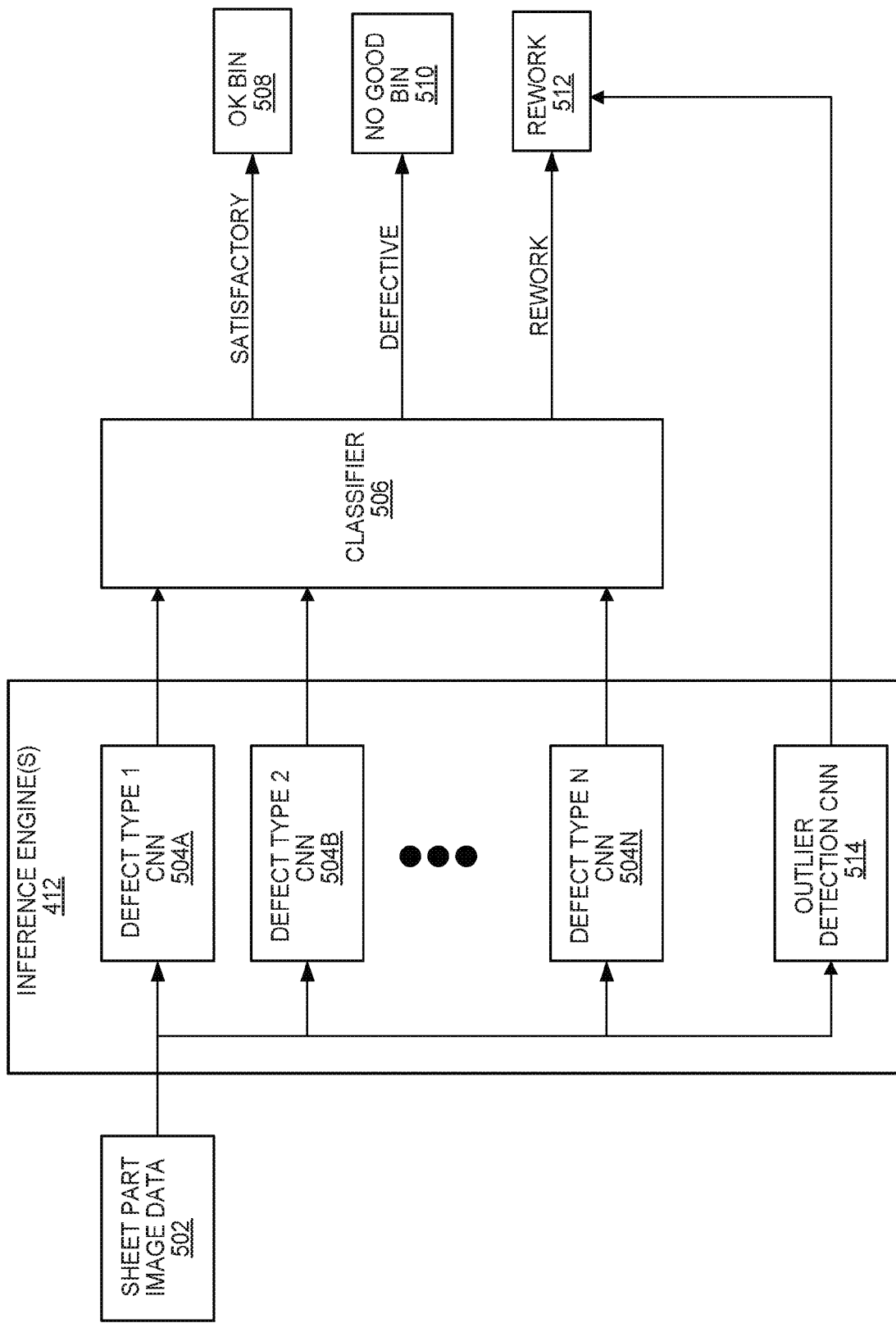
Figure 8A:
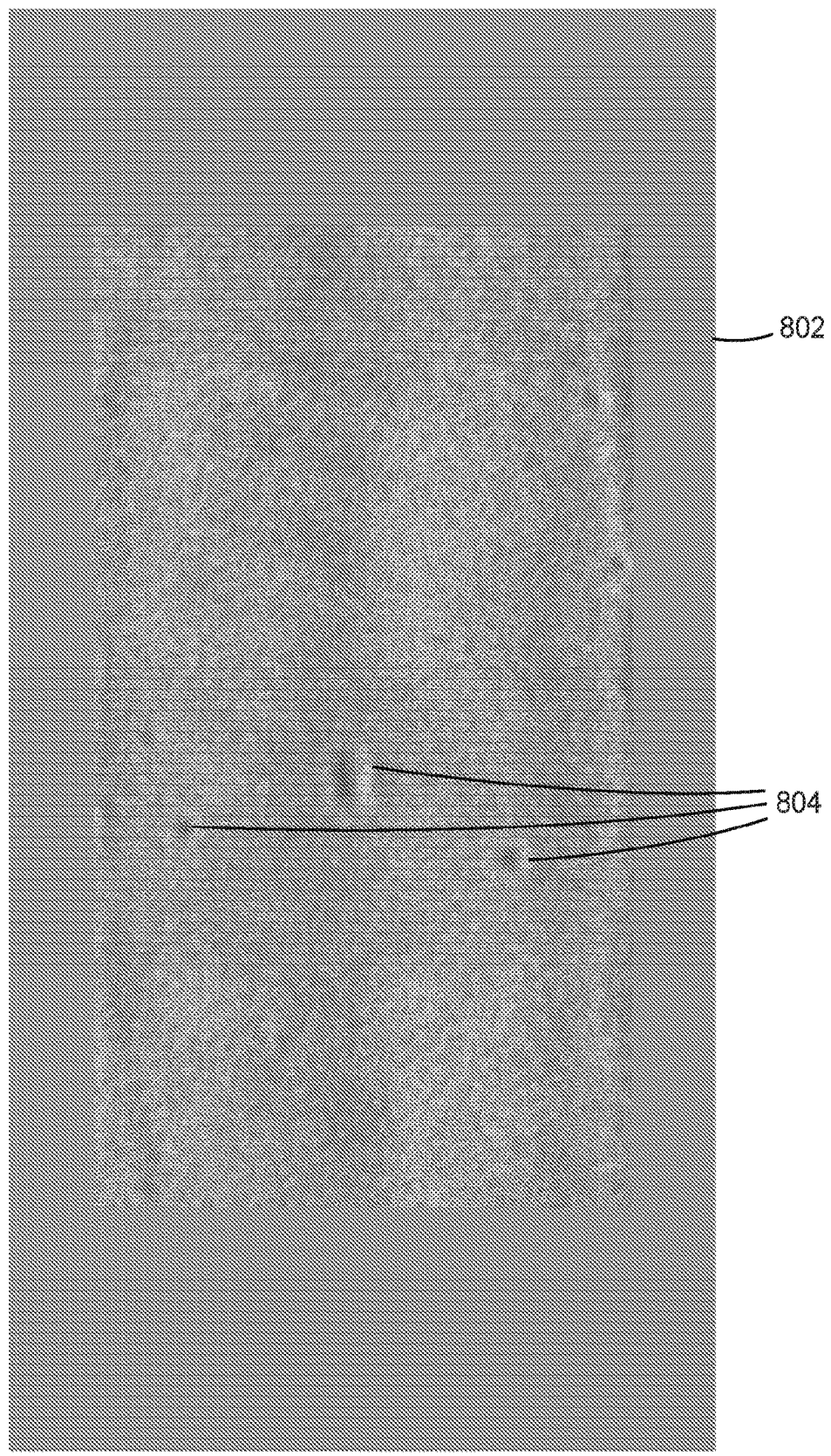
FIGS. 8A and 8B illustrate example sheet part defects that may be identified in accordance with at least one example technique described in this disclosure.
Figure 8B:
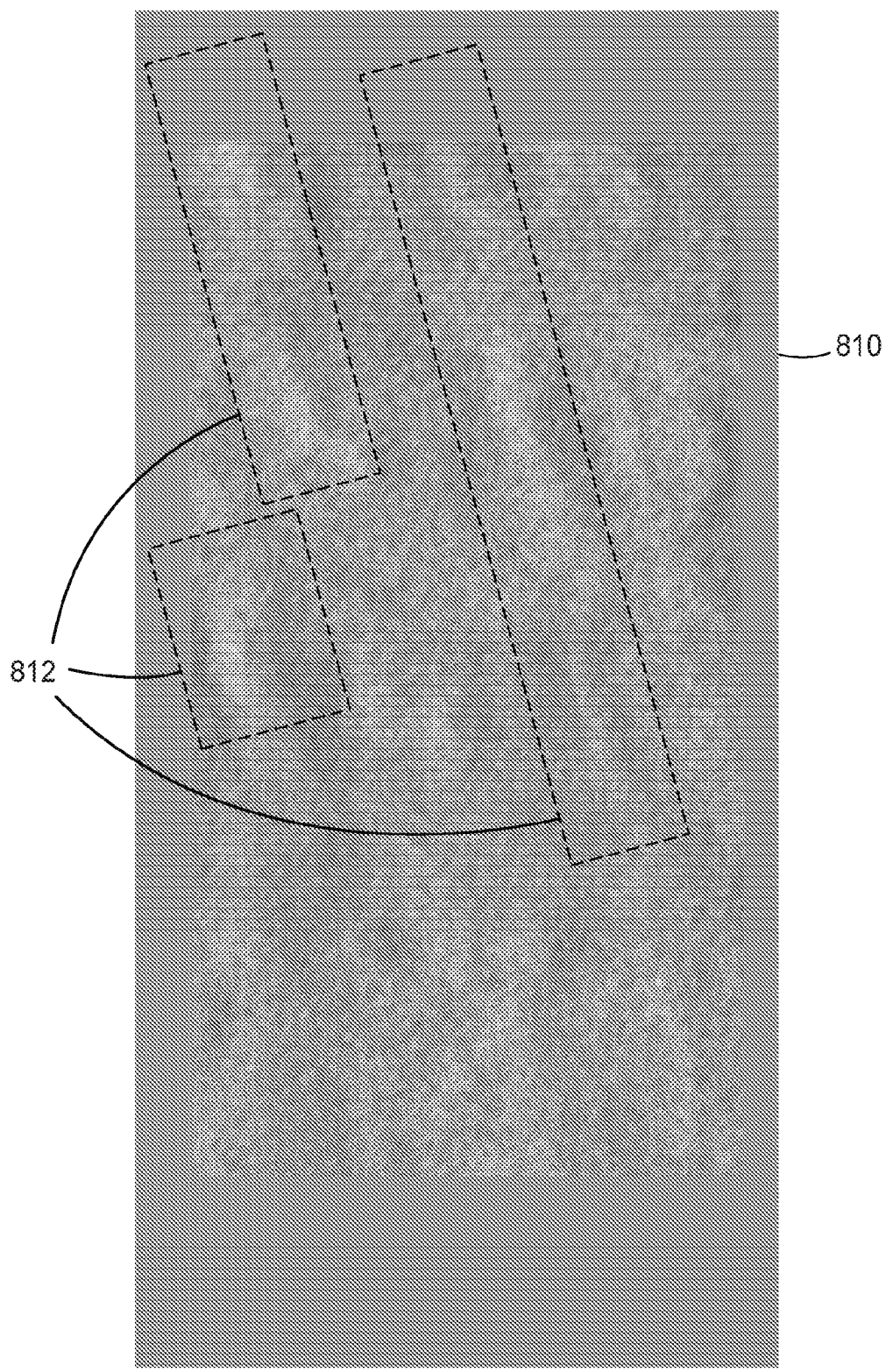

FIGS. 5A-5E are block diagrams showing example configurations of machine learning components of a sheet part inspection system, in accordance with at least one example technique described in this disclosure. In some aspects, the machine learning components can be implemented as part of defect detection unit 410 (FIG. 4). FIG. 5A illustrates a configuration of CNNs 504A-504N (collectively CNNs 504) in which each individual CNN is trained to detect a different sheet part defect. For example, CNN 504A may be trained to detect dent defects in a sheet part. An example sheet part having dent defects is shown in FIG. 8A. CNN 504B may be trained to detect wave defects in a sheet part. An example sheet part having wave defects is shown in FIG. 8B. Similarly, the other CNNs 504C-504N can be trained to detect defects such as wrinkles, bubbles, etc. One or more inference engines 412 can apply CNNs 504 to sheet part image data 502 to detect defects. In some aspects, there may be one inference engine 412 for each of CNNs 504. Further example details on training CNNs 504 using labeled sheet part image data are described below with respect to FIG. 6A.

In some aspects, hyperparameters for each CNN can be tuned for the defect to be detected by the CNN. The hyperparameters for a CNN may be tuned for accuracy with respect to the defect to be detected by the CNN and/or processing efficiency. For example, dent defects may be bigger and/or more easily detected than wrinkle defects. The hyperparameters for a CNN trained to detect dent defects may be tuned to dent detection and thus may detect dents more efficiently or faster than a CNN using untuned hyperparameters.

In the example configuration shown in FIG. 5A, sheet part image data 502 is provided as input to each of the CNNs 504A-504N. CNNs 504 each process the sheet part image data 502 to determine if the defect detected by the respective CNN is detected in the sheet part image data. In some aspects, the CNNs can be executed in parallel with one another. For example, each of the CNNs 504 may be processed on a different processor, processor core, or GPU. The output of each CNN of CNNs 504 can be data indicating whether or not the defect detected by the CNN was present in image data 502. In some aspects, the data can be a score having a value between zero and one that represents a probability that the defect is present in the sheet part based on the analysis of sheet part image data 502. In some aspects, a value indicating a severity of the defect may be output in addition to, or instead of, the probability value. The output of each CNN can be provided to a classifier 506. Classifier 506 can determine a quality category based on the scores. The quality category can be provided to a sorter or other device to indicate how the sheet part should be processed. In some example implementations, a sheet part can be sorted into an "OK" bin 508 if the quality category determined by classifier 506 indicates the quality of the sheet part is satisfactory. In some example implementations, a sheet part can be sorted into a "NO GOOD" bin 510 if the quality category indicates the quality of the sheet part is defective. In some example implementations, a sheet part can be sorted into a "REWORK" bin 510 if the quality category indicates the quality of the sheet part is not satisfactory, but the detected defects may allow for the sheet part to be reworked either into a satisfactory form or can be reworked for a different purpose.

In some aspects, classifier 506 may apply different thresholds to each score. In such aspects, if a score exceeds a max threshold for a particular defect, classifier 506 may classify the sheet part as defective. If the score is less than a minimum threshold, classifier 506 may classify the sheet part as satisfactory. If the score is between the minimum and maximum thresholds, classifier 506 may classify the sheet part as rework. The scores may be weighted according to a significance of the type of defect.

In some aspects, classifier 506 may implement a logical OR to the scores produced by each CNN. For example, if at least one score for a defect indicates a classification of defective, classifier 506 may classify sheet part as defective. If none of the scores for defects indicate a classification of defective, but at least one score indicates a classification as rework, then classifier 506 may classify the sheet part as rework. If none of the scores indicate defective or rework, classifier 506 may classify the sheet part as satisfactory.

In some aspects, classifier 506 may classify sheet parts according to combinations of scores output by CNNs 504. For example, none of the scores taken individually may indicate a defect, but combinations of two or more scores may cause classifier 506 to classify a sheet part as defective or rework. In some aspects, classifier 506 may use a set of one or more rules that can be applied to the score values to determine a quality category.

In some aspects, classifier 506 may implement a machine learning technique such as a neural network to determine a quality category for the sheet part. The neural network may be trained to determine quality categories based on different combinations of scores.

Weights can be assigned to each score in accordance with the significance of each defect in determining the quality category for the sheet part. For example, a dent in a sheet part may be considered a more serious defect than waves in a sheet part. A weighting can be assigned to the output of the CNN of CNNs 504 that detects dents that is higher than a weighting of an output of the CNN that detects waves in the sheet part. The classifier 506 can determine, based on the weighted scores received from each of CNNs 504, a quality category for the sheet part.

The quality category can be provided to a sorter or other device to indicate how the sheet part should be processed. In some example implementations, a sheet part can be sorted into an "OK" bin 508 if the quality category determined by classifier 506 indicates the quality of the sheet part is satisfactory. In some example implementations, a sheet part can be sorted into a "NO GOOD" bin 510 if the quality category indicates the quality of the sheet part is defective. In some example implementations, a sheet part can be sorted into a "REWORK" bin 512 if the quality category indicates the quality of the sheet part is not satisfactory, but the detected defects may allow for the sheet part to be reworked either into a satisfactory form or can be reworked for a different purpose.

FIG. 5B illustrates a configuration of CNNs 504A-504N where, as in FIG. 5A discussed above, each individual CNN is trained to detect a different sheet part defect. Additionally, outlier detection CNN 514 can be trained on sheet parts to learn how typical sheet parts (even those with some level of defects) appear in image data. Sheet part image data 502 can be provided to each of CNNs 504, and in addition, to outlier detection CNN 514. The output of outlier detection CNN 514 can be used to detect, from the sheet part image data 502, that the sheet part varies significantly from the typical sheet parts processed by system 100. In some aspects, if outlier detection CNN 514 detects such a sheet part, the sheet part can be assigned a quality category of rework. This can cause the sheet part to be sent to rework bin 512 for manual inspection. Such processing may be desirable because it can be used to discover new types of defects that may not be detectable using CNNs 504. A new CNN can be trained to detect the CNN and added to CNNs 504.

Figure 5C:
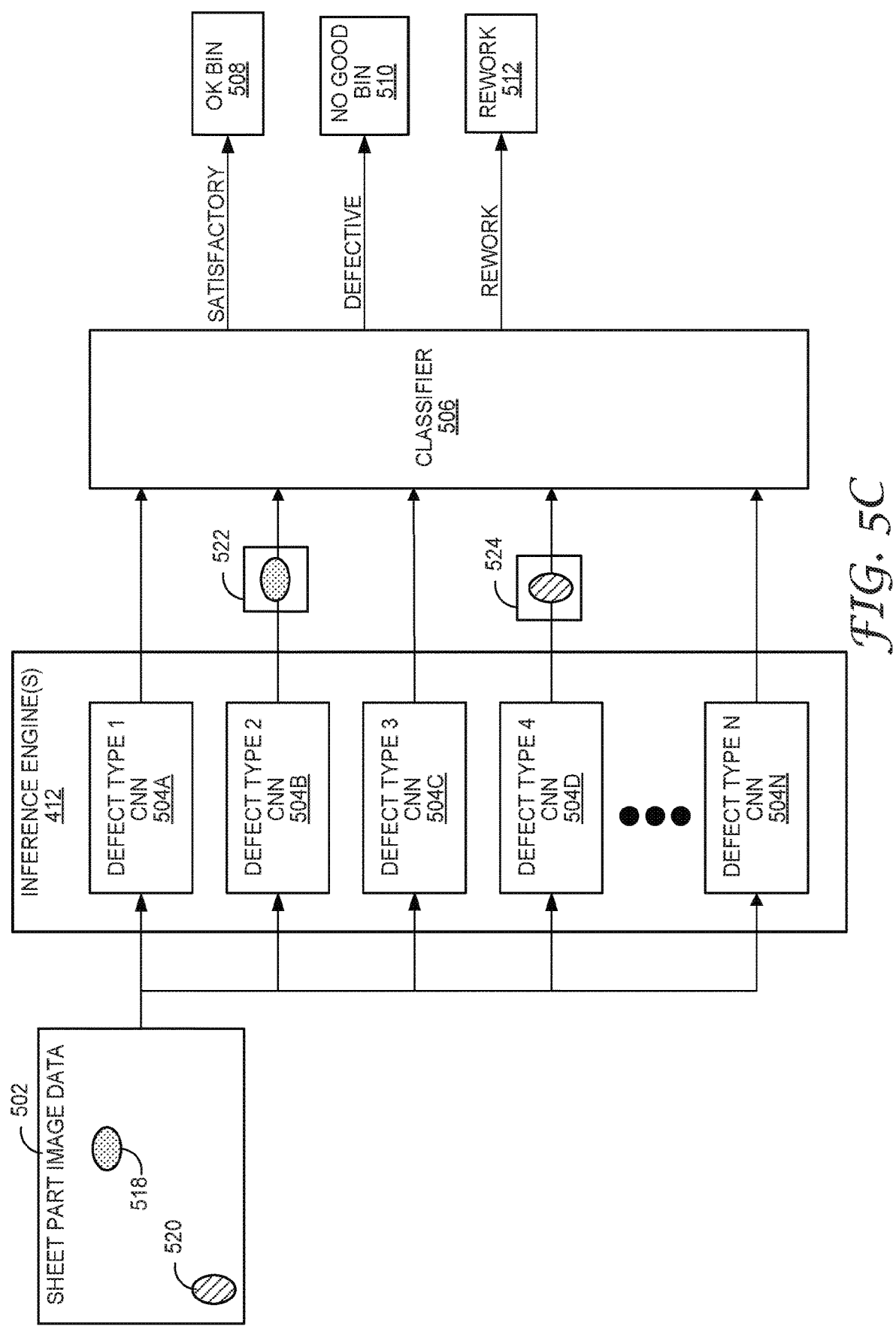

FIG. 5C illustrates a configuration of CNNs 504A-504N where each individual CNN is trained to detect a different sheet part defect. The output of CNNs 504 in this example can be a subset of the full image data where the defect was detected. In the example illustrated in FIG. 5C, sheet part image data 502 includes image data for two defects, 518 and 520. Defects 518 and 520 may be the same type of defect or they may be different types of defects. One of more of CNNs 504 may be trained such that the CNN can detect a position of a defect but may not be able to determine a severity of the defect from the image data. The CNN can output a subset of the image data that includes the area around the position of the suspected defect In this example, CNNs 504 may detect the presence of different types of defects and their position (s), and classifier 506 in this example can be a CNN that is trained to determine a severity associated with the detected defects. In the example shown in FIG. 5C, image data subset 522 corresponds to image data including defect 518, and image data subset 524 corresponds to image data including defect 520 found in sheet part image data 502. CNNs 504B and 504D can detect the presence of defects 518 and 520 respectively. The image data subset can be provided to classifier 506, which can be trained to determine a severity of the defects based on the image data subsets for the defects.

Figure 5D:
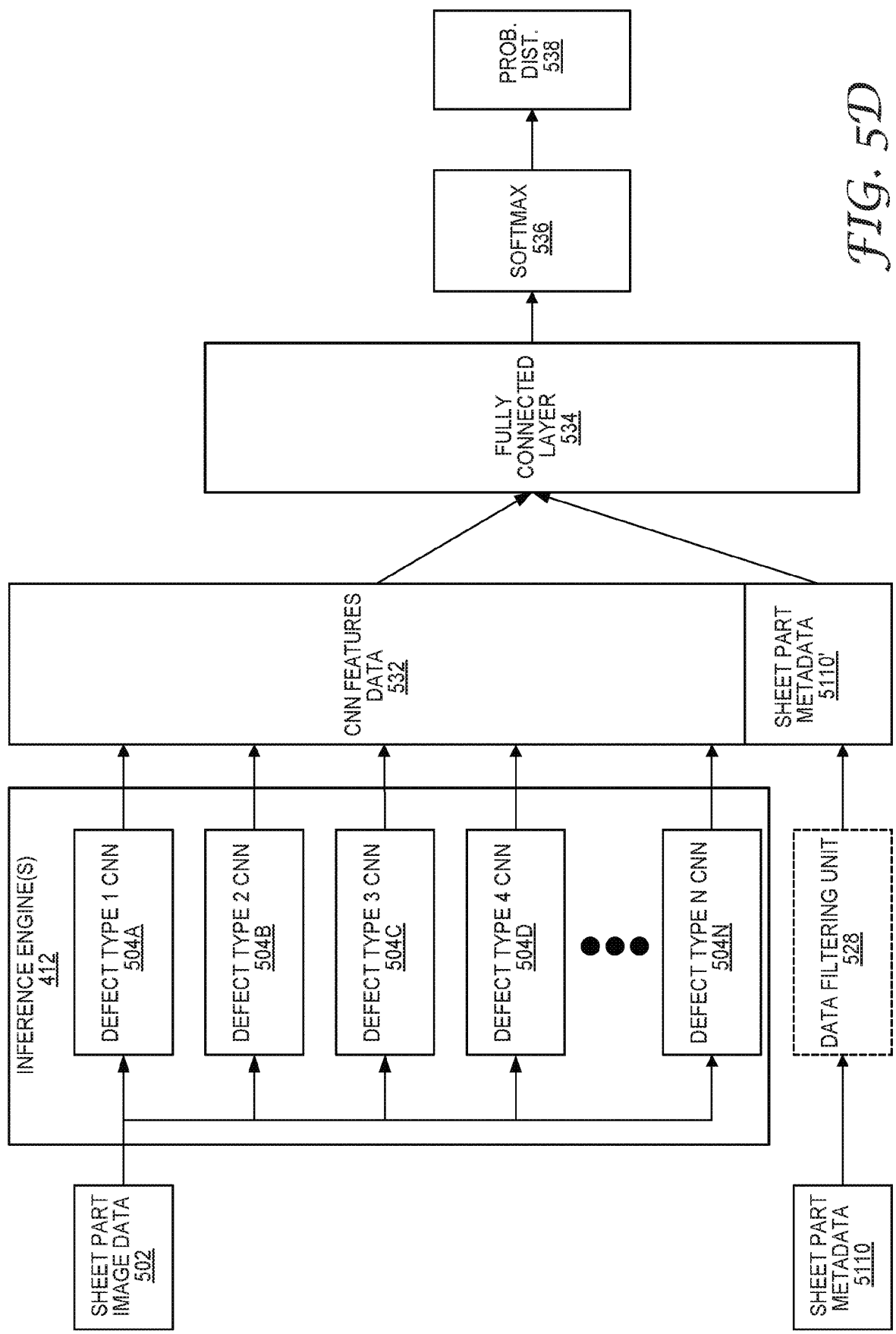

FIG. 5D illustrates a configuration of machine learning models including a machine learning model trained with sheet part metadata according to techniques of the disclosure. In the example illustrated in FIG. 5D, CNNs 504A-504N are each trained to detect a different sheet part defect based on image data (or subsets of image data) for the sheet part. The output of CNNs 504A-504N (e.g., data indicating whether a defect detected by each CNN is present) can be collected into CNN features data 532. Sheet part metadata 526 can also be used as input to an inspection system. Sheet part metadata 526 can include data describing aspects of the manufacture of a sheet part. Examples of such metadata include source data, time data, temperature data, position data, process setting data, and measurement data.

Source data can include data indicating where the sheet part came from. Examples of such data include a manufacturing line identifier, a warehouse identifier etc. Other source data can include conditions or qualities of the source, such as whether a warehouse is temperature and/or humidity controlled. Time data can include the time that the sheet part was made. Temperature data can include the temperature at the time the sheet part was made or when the web for the sheet part was made. Position data can include the position within a web that the sheet part was produced from. Process setting data can include data values associated with processes in the manufacture of the sheet part such as an oven temperature, tension value, speed value, etc. Measurement data can include data such as ambient temperature and/or humidity when the sheet part was made or when the web for the sheet part was made. Measurement data may also include data resulting from non-destructive tests applied to the sheet part or web for the sheet part.

Sheet part metadata 526 can optionally be processed by data filtering unit 528. Data filtering unit 528 can cleanse the data and perform feature extraction on the data. For example, data filtering unit 528 may normalize data values, filter unused, corrupted and/or incomplete data etc. to produce filtered sheet part metadata 526' Sheet part metadata 526' (or sheet part metadata 526 if filtering is not performed) along with CNN features data 532 may be provided as input to a fully connected neural network layer 534. The output of fully connected layer 534 can represent data indicative of whether any of the defects detected by CNNs 504 are present in the image data based on both the image data 502 and the sheet part metadata 526. In some aspects, the output of fully connected layer 534 can be provided as input to a softmax function 536. The softmax function 536 can convert the vector output of fully connected layer 534 to a probability distribution 538 that indicates a probability that a sheet part has each defect detected by CNNs 504 based on the image data.

The sheet part metadata 526, 526' combined with CNN features data 532 may improve the defect detection of an inspection system. Time metadata may be useful in determining a defect is present when it is known that a particular defect is more likely to appear during a particular time period. For example, a particular defect may be more likely to appear during a night shift of production.

Position metadata may be useful in determining a defect is present when a defect is more likely to appear when the sheet part is produced from a particular position of a web. For example, a particular defect may be more likely to occur in a center position of a web, thus sheet parts made from the center position may be more likely to have the particular defect.

Process settings metadata may be useful in determining a defect when the defect is more likely to occur based on one or more process settings. As an example, a defect may be more likely to occur when the process to manufacture the sheet parts is performed at a higher oven temperature.

Measurement metadata may be useful in determining a defect when the defect is more likely to occur based on the measurement data. Such measurement data can include data from obtained from external sensors (e.g., sensors not specifically part of the devices used to manufacture a sheet part) and/or data from non-destructive quality measurements. For example, a lamination related defect may be more likely to occur when the ambient air temperature during a lamination operation used to create the sheet part exceeds a threshold. The ambient air temperature data may be obtained from an external sensor at or around the time the sheet part was manufactured and used during the inspection process of the sheet part.

As one example of a non-destructive quality measurement, measurement data obtained during an air permeability test on non-woven material of a sheet part may be useful in determining whether a perforation defect is present in a sheet part such as a medical filter.

Figure 5E:
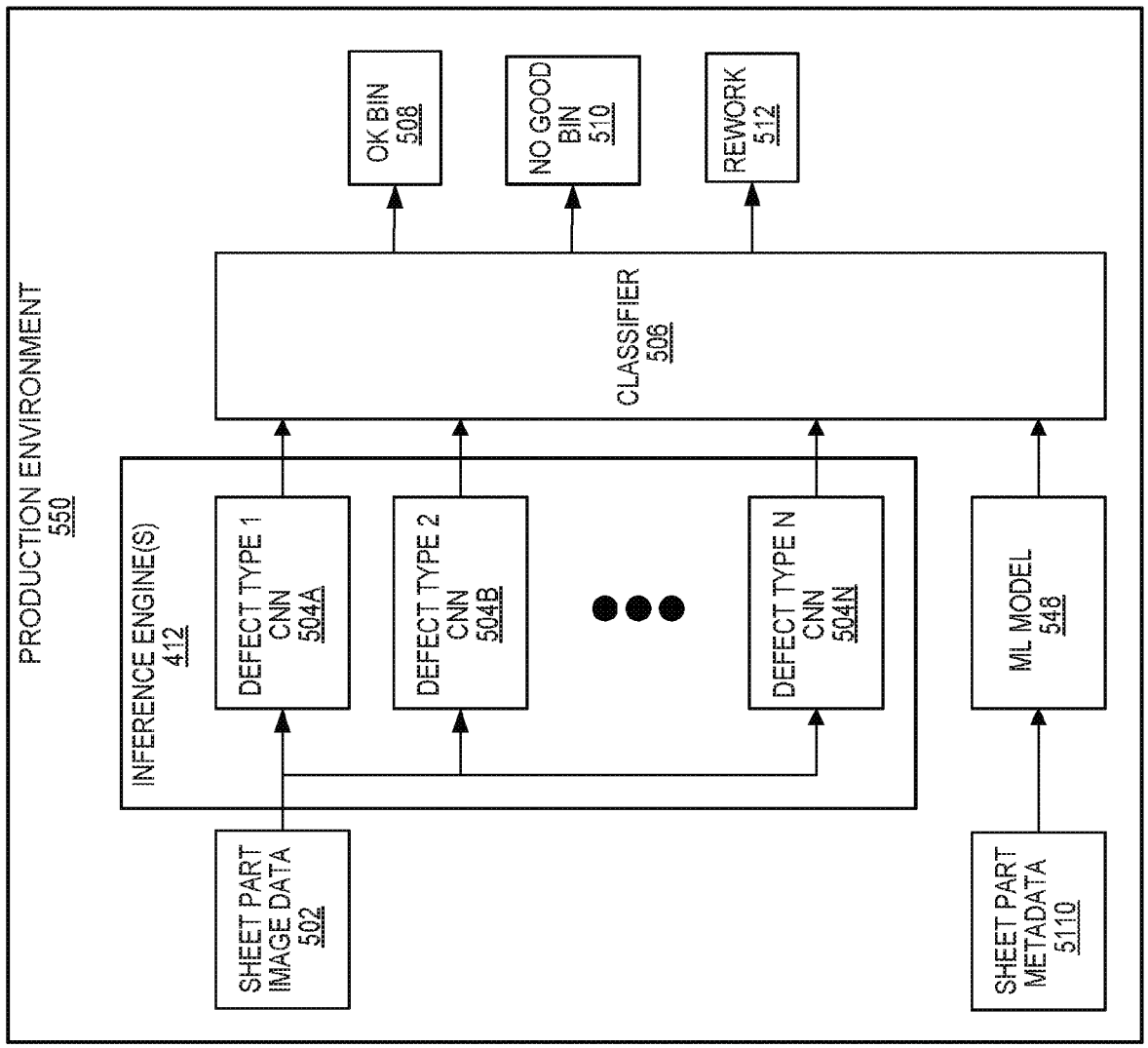
Figure 5E:
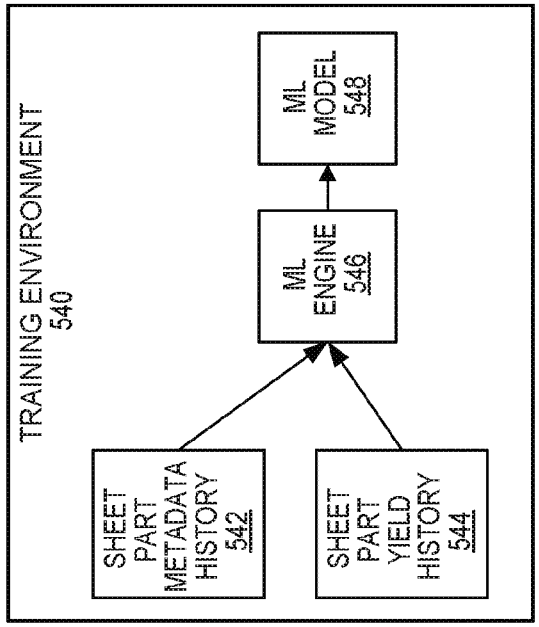

FIG. 5E illustrates a configuration of machine learning models including a machine learning model 548 trained with sheet part metadata according to techniques of the disclosure. In the example shown in FIG. 5E, machine learning engine 546 can receive sheet part metadata history 542 and sheet part yield history 544 during a training phase in a training environment 540. Machine learning engine 546 can use sheet part metadata history 542 and sheet part yield history 544 to generate a machine learning model 548. Sheet part metadata history 542 can include metadata values obtained over a period of time. As discussed above, the metadata can include source data, time data, temperature data, position data, process setting data, and measurement data. Sheet part yield history 544 can be obtained for the same period of time. Machine learning model 548, once trained, can be used to determine a probability, based on sheet part metadata for a sheet part, of the sheet part being defective. The trained machine learning model 548 can be provided to a production environment 550 that includes an inspection system 100. The output defect prediction of machine learning model 548 can combined with the defect predictions provided by each of CNNs 504A-504N by weighing unit 506 to determine data indicative of a quality characteristic of a sheet part. As discussed above, the data indicative of the quality of the sheet part can be used to perform operations such as sorting the sheet part into an OK bin 508, a no-good bin 510, and a rework bin 512. The addition of the machine learning model 548's output based on sheet part metadata to the output of the CNNs 504A-504N based on image data for a sheet part may produce a more accurate determination of the quality of the sheet part.

The above-described techniques shown in FIGS. 5A-5E may be combined in various implementations. For example, an implementation may include an outlier detection CNN 514 of FIG. 5B and the image cropper 540 shown in FIG. 5C. Further, any of the techniques illustrated with respect to FIGS. 5A-5C may incorporate sheet part metadata 526 as discussed with respect to FIGS. 5D and 5E. Further, the above-described techniques may be combined with traditional inspection techniques. For example, traditional inspection techniques may be used to detect defects that are more easily detected (e.g., defects exhibiting high contrast in image data) and sort sheet parts accordingly. The techniques described herein may then be applied to sheet parts that pass the traditional inspection techniques.

Figure 6A:
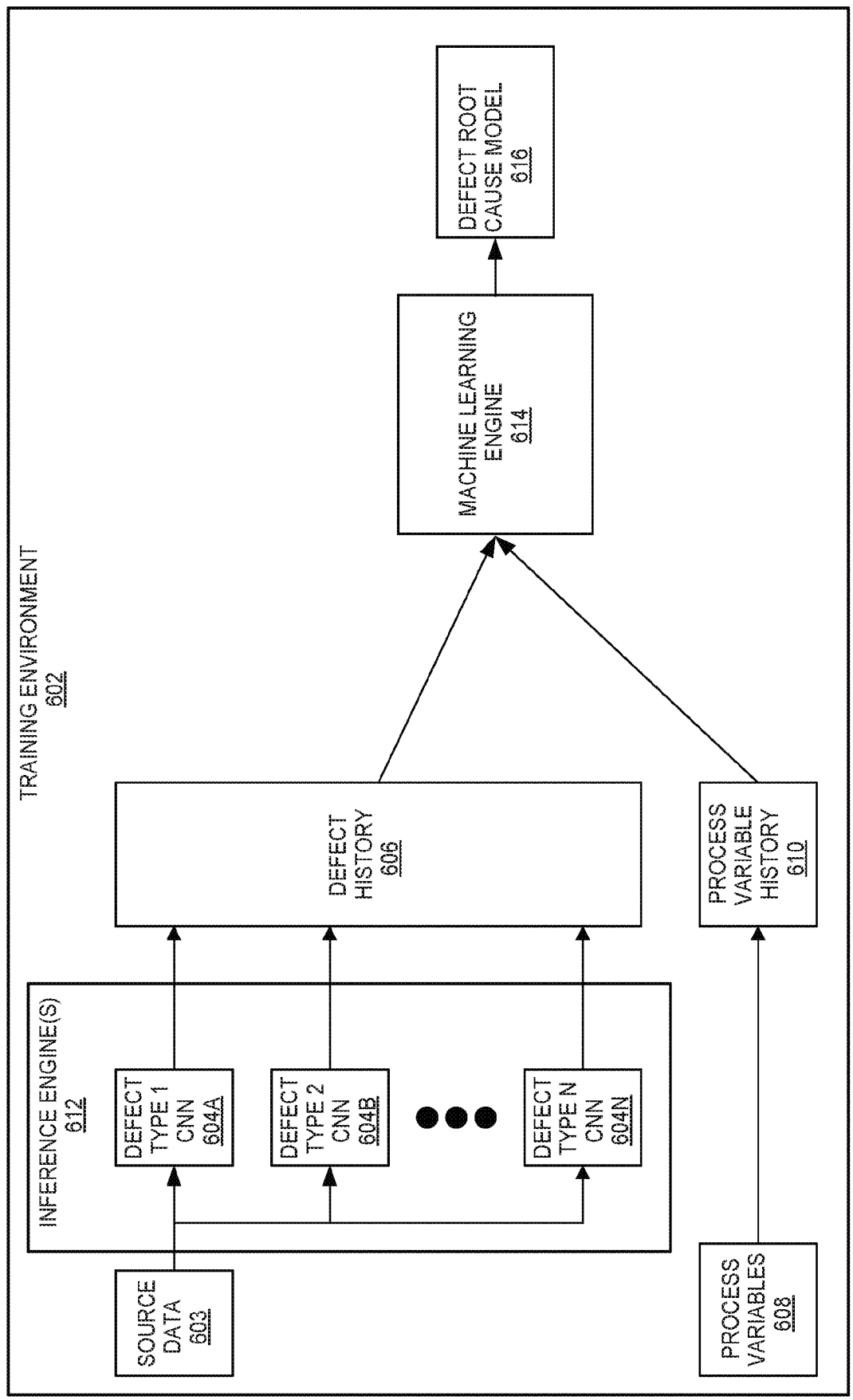
FIG. 6A is a block diagram of a training environment including a machine learning engine to generate a machine-learning model that correlates sheet part defects with process variables at least one example technique described in this disclosure.

FIG. 6A is a block diagram of a training environment 602 including a machine learning engine 614 to generate a machine-learning model (defect root cause model 616) that correlates sheet part defects with process variables at least one example technique described in this disclosure. The example training environment 602 will be used to illustrate training of CNNs that detect defects using images of source components, and to illustrate training of a machine learning model that can be used to determine or suggest root causes of defects. Training environment 602 can include inference engine(s) 612, CNNs 604A-604N (collectively "CNNs 604") and a machine learning engine 614. Each of CNNs 604A-604N can be trained to detect a different type of defect in a manufacturing component by using source data 603. In some aspects, source data 603 can be a rich set of image data for a set of components having different defects. The images in source data 603 can be labeled images where a label can represent the ground truth with respect to the type of defect (if any) shown by the corresponding image. The images in source data 603 may be selected such that there are many images of each type of defect. As an example, the component can be a sheet part, and the source data 603 can be a rich set of image data associated with sheet parts having different types of known defects. A machine learning engine can be used to train each of CNNs 604 to detect a different type of defect using the labeled images. Once trained, CNNs 604 can be deployed in a production environment to recognize defects in images of components. In such examples, CNNs 604, once trained, can correspond to CNNs 504 of FIG. 5.

In some aspects, the component can be a web and the source data 603 can include image data associated with portions of one or more webs. In such examples, CNNs 604 can each be trained to detect a different type of defect in a web or portions of a web.

As noted above, training environment 602 can be used to train a defect root cause model 616 to identify a potential root cause of a defect. After CNNs 604 have been trained as described above, inference engine(s) 612 can apply CNNs 604 to source data 603 to detect different types of defects. In this example, source data 603 may be labeled both with the type of defect and a time that the component was manufactured. The output of CNNs 604 can be stored in defect history 606, which can represent a history of defects over a period of time.

Process variables 608 can be metadata describing aspects of processing or manufacturing conditions at the time the component associated with the source data 603 was manufactured. As noted above, examples of such metadata include time data, temperature data, position data, process setting data, and measurement data associated with manufacturing conditions at the time the component associated with time source data 603 was manufactured. Process variables 608 can be stored in process variable history 610.

Machine learning engine 614 can analyze defect history 606 and process variable history 610 to determine correlations (if any) between a defect detected in a component and the process variables that were obtained at the time the component was manufactured. For example, machine learning engine 614 can apply time series analysis to defect history 606 and process variable 610 to determine correlations between a detected defect in a component and the process variables at the time the component was manufactured. The learned correlations can be maintained in a defect root cause model 616. Once trained, defect root cause model 616 can be utilized in a production environment as described in FIG. 6B.

Figure 6B:
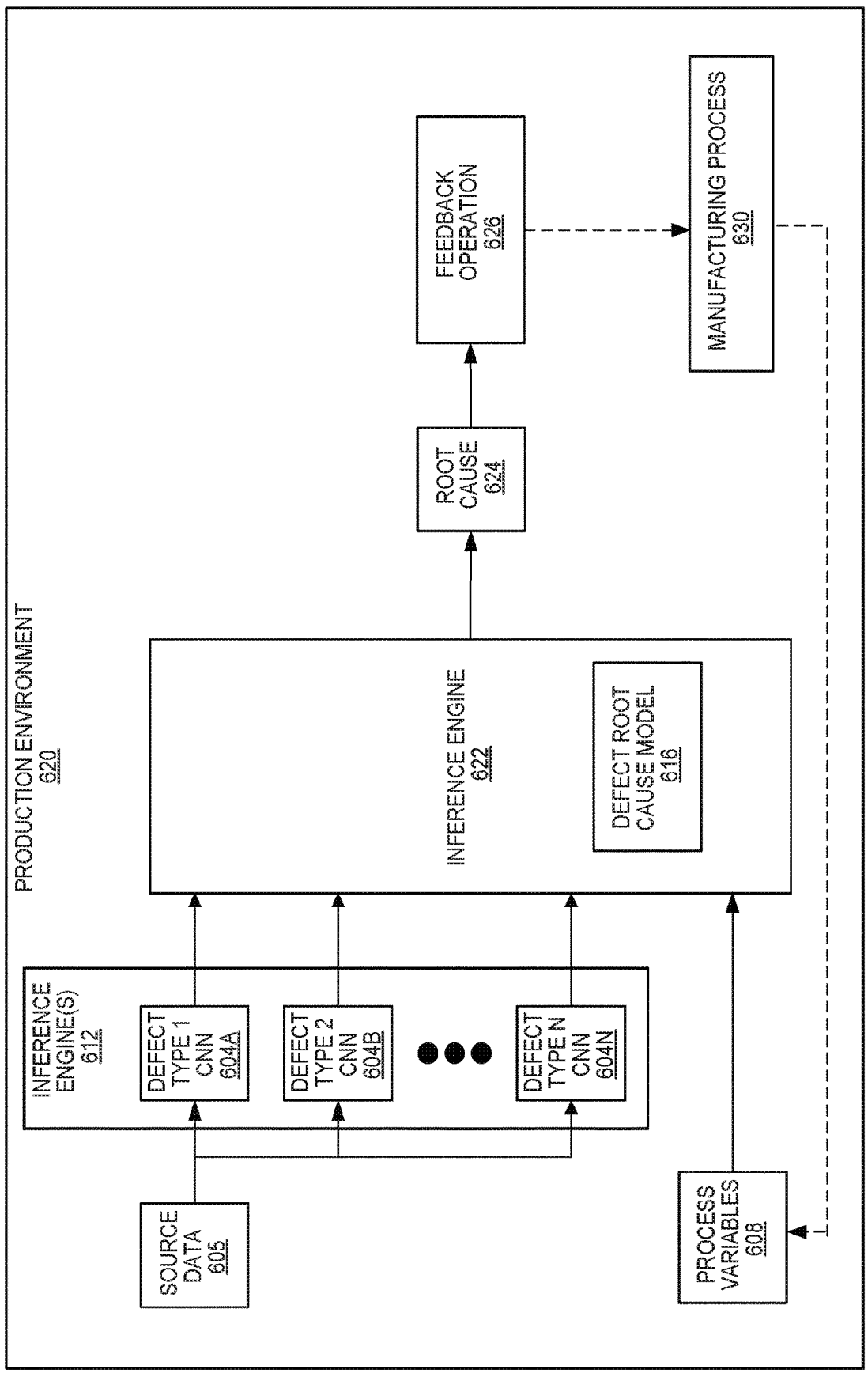
FIG. 6B is a block diagram of a sheet part production environment using the machine learning model of FIG. 6A to determine a root cause of a sheet part defect according at least one example technique described in this disclosure.

FIG. 6B is a block diagram of a production environment 620 using trained defect root cause model 616 to determine a root cause of a sheet part defect according at least one example technique described in this disclosure. Production environment 620 can include a manufacturing process 630 that produces a manufactured component. For example, manufacturing process 630 may correspond to manufacturing component 102 (FIG. 1) that produces sheet parts. Manufacturing process 630 may produce web components that can be used to make sheet parts.

An inspection device such as inspection device 105 (FIG. 1) can provide source data 605 associated with the component to a processing unit such as processing unit 120 (FIG. 1). The source data 605 may correspond to sheet part image data 502 (FIGS. 5A-5E), or it may be image data for a web. Inference engine(s) 622 of the processing unit can pass the source data 605 through CNNs 604 to detect defects in the component based on the source data 605.

Manufacturing process 102 for the component can generate or otherwise be associated with process variables 608. As noted above, process variables 608 can be time data, temperature data, position data, process setting data, and measurement data associated with manufacturing conditions at the time the component associated with source data 605 was manufactured. Inference engine 622 can analyze source data 605 and process variables 608 using defect root cause model 616 trained as discussed above. For example, inference engine(s) 622 can provide output of CNNs 604 to inference engine 622 indicating whether one or more defects were detected based on the source data 605. Inference engine 622 can infer a root cause 624 for the detected defect(s), using defect root cause model 616 and the process variables 608 at the time the component was manufactured. A processing unit can determine one or more feedback operations 626 designed to mitigate defects in the manufactured components thereby potentially improving yield of manufactured components. The feedback operation 626 may alert an operator to a potential root cause. The alert may include a set of one or more recommended process adjustments that can be provided to the operator. In some aspects, the feedback operation 626 may be a modification of a processing variable that can be communicated to manufacturing process 630 to automatically modify the manufacturing process.

The following non-limiting examples can illustrate the operation of training environment 602 and production environment 620 with respect to the manufacture of sheet parts. One of CNNs 604 may detect particle defects in the image data for sheet parts. Such particles may be caused by human handling during an upstream manufacturing process. Machine learning engine 614 may correlate time data associated with the defect to reveal a spike in particle defects every shift change. As one example, this may be traced back to the opening of a clean room door.

One of CNNs 604 may detect distortion defects that may occur over the length or width of a sheet part. Defect root cause model may be used to infer a root cause of a distortion defect as being due to tension variation during winding and unwinding in a slitting process used to manufacture the sheet part. A feedback operation 626 may be communicated to a manufacturing process to increase winding tension when the inspection system identifies wrinkles in the crossweb direction and decreases tension when it identifies them in the downweb direction.

One of CNNs 604 may detect dents (e.g., a localized depression) in a sheet part. A defect root cause model 616 may be trained to correlate dents with surface debris in the web handling rolls during a coating or slitting process that causes repeating dents. A feedback operation 626 can be to trigger an alarm to clean rolls when a repeating dent is identified by the inspection system. Based on the size, frequency, and/or position of dents in the parts, the system may be trained to identify a specific roll that is producing the dents.

The following non-limiting examples can illustrate the operation of training environment 602 and production environment 620 with respect to the manufacture of sheet web. One of CNNs 604 may be trained to detect thin spots in a coating of a web. A defect root cause model 616 may be trained to determine, based on characteristics of the thin spots a correlation with blockage in coating dye or contamination dragging on the web. A feedback operation 626 for this defect root cause may be to generate an alarm based on the type of streak caused by the thin spot and classified by defect root cause model 616. Depending on the root cause and alarm generated by the root cause, corrections could be made including cleaning die, or removing debris from the manufacturing line.

As one example, one of CNNs 604 may be trained to detect "Machine Direction Line (MDL) defects in a film. In various examples, MDL defects are defects in the surface of the film that extend in the downweb (longitudinal axis) direction of the film and often have extremely small dimensions in the crossweb direction, such as in a range of 10-100 nanometers. This level of crossweb variation in the film surface is extremely difficult to detect using known film inspection techniques. Example detection techniques are described in Patent Cooperation Treaty Published Application WO/2018/045280, entitled "MACHINE DIRECTION LINE FILM INSPECTION," hereby incorporated herein by reference. An MD line may be detected as a thin spot in a web film (indicative of a caliper configured in a low position). In such an example, defect root cause model 616 may be trained to determine that the root cause 624 of an MD line defect is a problem in an extrusion die. A feedback operation 626 may be similar to that of a streak defect, that is, generate an alarm based on the type of streak caused by the MD lines as classified by defect root cause model 616. Depending on the root cause and alarm generated by the root cause, corrections could be made including cleaning die, or removing debris from the manufacturing line.

As another example, one of CNNs 604 may be trained in training environment 602 to detect scratches in a web based in input image data. Such defects may be small directional scratches on the coating of a film. A root cause of a scratch defect may be mismatched roller speeds, bearing wear causing drag, contamination on rollers, etc. Root cause defect model 616 may be trained to distinguish between the type of scratch (small, long, downweb, diagonal etc.) and/or by the grouping, density, or position of the scratches and associate a root cause with the type of scratch.

As another example, CNNs 604 may be trained to detect defects in conjunction with an inspection device using ultraviolet light to excite fluorescing agent(s) in one or more layers of the web. In some examples, the fluorescing agents emit light when excited by ultraviolet light having another wavelength, such as light within the visible spectrum. An image capture device captures one or more images of the web after the web is exposed to the ultraviolet light and a computing system analyzes the images to determine whether the web includes a defect. If a portion of the images is darker than surrounding portions of the image, this may indicate that portion of the web did not have sufficient material for the layer(s) impregnated with the fluorescing agent, indicative of a potential defect in that area of web. Example detection techniques are described in U.S. Provisional Patent Application 62/932,717, entitled "ULTRAVIOLET LIGHT-BASED INSPECTION FOR DETECTING COATING DEFECTS IN MANUFACTURED WEBS USING FLORESCING AGENTS," incorporated herein by reference.

As another example, CNNs 604 may be trained to detect defects and classify sheet goods based on applications-specific parameters that may be used to influence the conversion selection process. Example detection techniques are described in U.S. Pat. No. 8,935,104, entitled "APPLICATION-SPECIFIC REPEAT DEFECT DEFECTION IN WEB MANUFACTURING PROCESSES," incorporated herein by reference.

Figure 7:
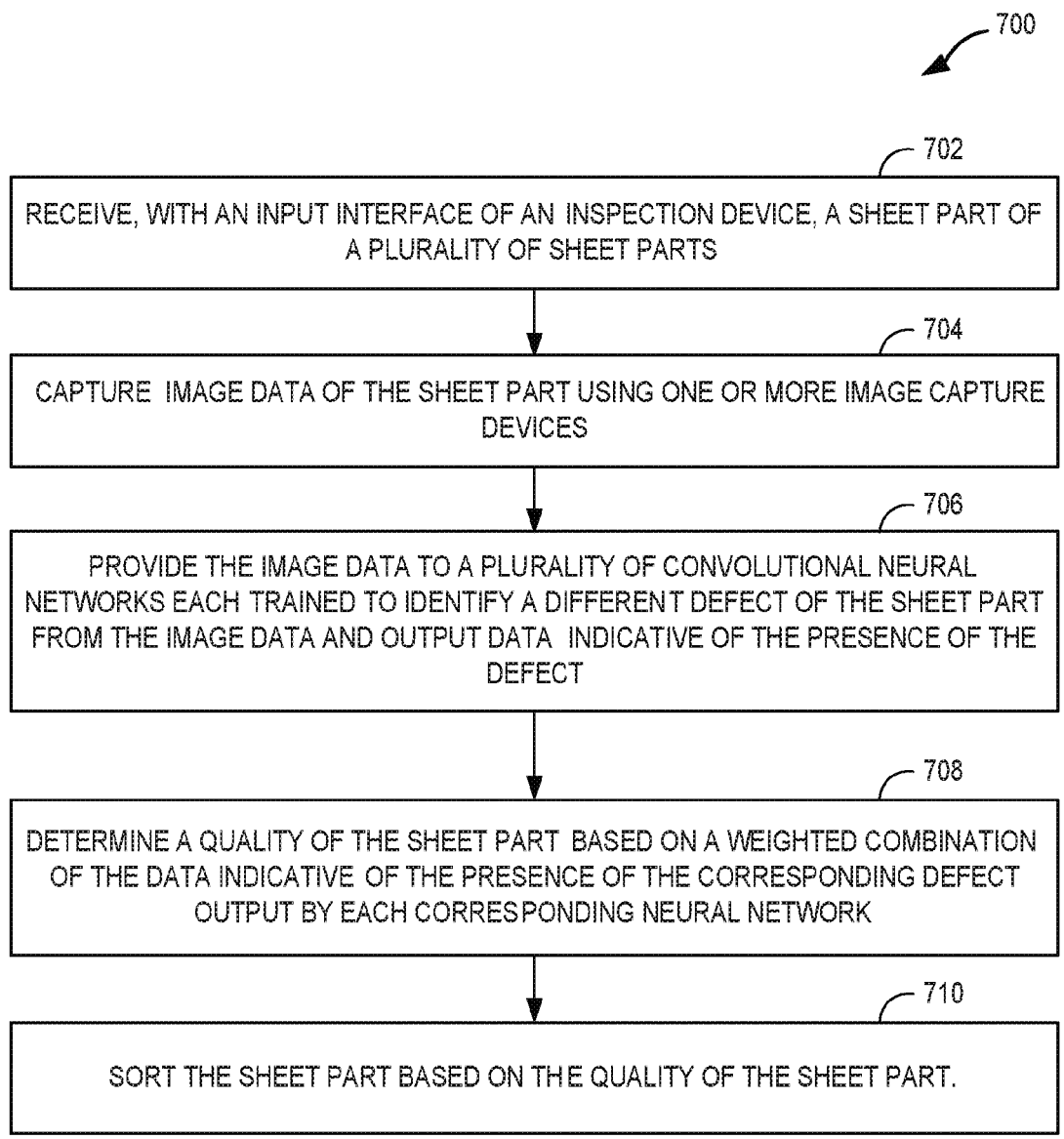
FIG. 7 is a flowchart illustrating example operations of a method for determining a quality of a sheet part, in accordance with at least one example technique described in this disclosure.

FIG. 7 is a flowchart 700 illustrating example operations of a method for determining a quality of a sheet part using an inspection device, such as inspection device 105 (FIG. 1), in accordance with at least one example technique described in this disclosure. The example operations are described with respect to system 100 of FIG. 1. However, the example operations of flowchart 700 should not be construed as being limited to system 100. The example operations of flowchart 700 may be performed by any element or group of elements configured to perform the operations shown in flowchart 700.

According to example operations of flowchart 700, an input zone of inspection device 105 receives a sheet part of a plurality of sheet parts 104 (702). In some examples, to receive the sheet part, inspection device 105 selects the sheet part from a stack of sheet parts and transfers the sheet part to the input zone. In order to select the sheet part, inspection device 105 may include a selection member configured to remove the sheet part from the stack of sheet parts and place the sheet part on the input zone. Additionally, or alternatively, to receive the sheet part, the system 100 may be configured to receive the sheet part from a device operator, where the device operator manually places the sheet part on the input zone. In some examples, the input zone of inspection device 105 includes a beginning of a moving belt that is configured to transport the sheet part from an endpoint of manufacturing process 102 through imaging unit 108.

Imaging unit 108 can detect the sheet part and capture image data of the sheet part using one or more image capture devices (704). In some examples, imaging unit 108 includes a light, where the sheet part travels between the light and image capture devices 110. Consequently, in some such examples, image capture devices 110 may detect that the sheet part is partially obscuring the light as the sheet part passes between the light and image capture devices 110, and image capture devices 110 may thus determine that the sheet part is within imaging unit 108. In response to detecting that the sheet part is within the imaging unit, at least one image capture device 110 captures an image of the sheet part. In some examples, a single image capture device 110 can be used to capture images of sheet parts. In other examples, multiple image capture devices 110 can capture images of sheet parts. The multiple images can be combined into a composite image.

Inspection device 105 outputs image data for the captured images to a plurality of CNNs 504 implemented by a defect detection unit 410 of processing unit 400 (706). Each of the CNNs 504 may be previously trained to detect a different sheet part defect in image data for a sheet part. The output of each CNN can be data indicative of whether or not the sheet part defect detected by the CNN is present in the sheet part based on the image data provided to the CNN. In some aspects, the data indicative of whether or not the sheet part defect detected by the CNN is present in the sheet part can be a probability value indicating the probability that the defect detected by the CNN is present in the sheet part based on the image data.

Quality unit 420 of processing unit 400 can receive the output of CNNs 504 and use the output to determine a quality of the sheet part corresponding to the image data (708). In some examples, quality unit 420 may apply different weights to the output of each of CNNs 504 in accordance with the significance of the defect detected by the CNN. The weighted outputs may be evaluated individually or in combination to determine data indicative of a quality associated with the sheet part.

Quality unit 420 may sort the sheet part according to the data indicative of the quality of the sheet part (710). In some examples, the sheet part may be classified into at least one of a satisfactory category, a defective category, or a rework category. In some examples, processing unit 400 may sort the sheet part into a bin based on the category.

FIGS. 8A and 8B illustrate example sheet part defects that may be identified in accordance with at least one example technique described in this disclosure. FIG. 8A illustrates an example sheet part 802 having dent defects 804 that may be detected using the techniques disclosed herein. Dent defects 804 may be low contrast defects and as such, may not be detected using traditional image processing techniques of existing systems.

FIG. 8B illustrates an example sheet part 810 having a waviness defect that may be detected using the techniques described herein. As with the dent defects 804 shown in FIG. 8A, the waves in sheet part 810 may be low contrast and/or low frequency, and as such, may not be detected using traditional image processing techniques of existing systems.

The techniques described herein have been discussed primarily in the context of inspecting sheet parts for defects. The techniques can be readily applied to other inspection systems. For example, CNNs may be trained to detect defects in web materials used to make sheet parts or other products as will be discussed below with reference to FIG. 9

Figure 9:
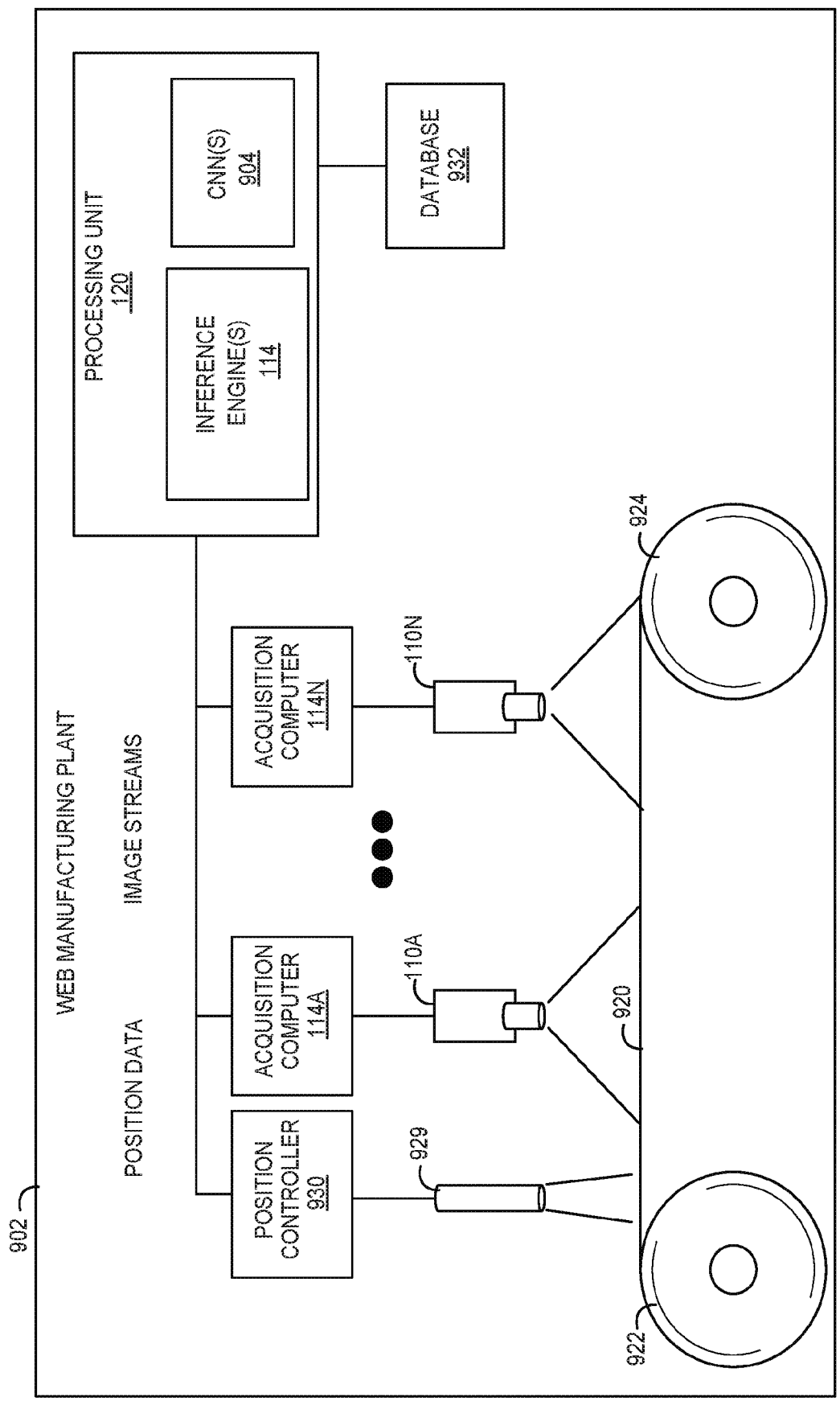
FIG. 9 is a block diagram illustrating an example embodiment of one process line in an example embodiment of web manufacturing plant.

FIG. 9 is a block diagram illustrating an example embodiment of one process line in an example embodiment of web manufacturing plant 902. In the example embodiment, a segment of a web 920 is positioned between two support rolls 922, 924. Image acquisition devices 110A-110N ("image acquisition devices 110") are positioned in proximity to the continuously moving web 920. Image acquisition devices 110 can scan sequential portions of the continuously moving web 920 to obtain image data. Acquisition computers 214 collect image data from image acquisition devices 110 and transmit the image data to processing unit 120 for analysis.

Image acquisition devices 110 may be conventional imaging devices that are capable of reading a sequential portion of the moving web 920 and providing output in the form of a digital data stream. As shown in FIG. 2, imaging devices 110 may be cameras that directly provide a digital data stream or an analog camera with an additional analog to digital converter. Other sensors, such as, for example, laser scanners may be utilized as the imaging acquisition device. Examples of devices suitable for acquiring the image include linescan cameras such as models from Dalsa (Waterloo, Ontario, Canada), or E2V (Chelmsford, United Kingdom).

The image may be optionally acquired through the utilization of optic assemblies that assist in the procurement of the image. The assemblies may be either part of a camera or may be separate from the camera. Optic assemblies utilize reflected light, transmitted light, or transflected light during the imaging process. Reflected light, for example, is often suitable for the detection of defects caused by web surface deformations, such as surface scratches.

Position controller 930 controls position mark reader 929 to collect roll and position information from web 920. For example, position mark controller may include one or more photo-optic sensors for reading position marks such as bar codes, fiducial marks or other position indicia from web 920. In addition, position controller 930 may receive position signals from one or more high-precision encoders engaged with web 920 and/or rollers 922, 924. Based on the position signals, position controller 930 determines position information for each detected position mark. For example, position controller 930 may produce position information locating each detected position mark within a coordinate system applied to the process line. Alternatively, processing unit 120 may place each of the detected position marks within the coordinate system based on the position data received from position controller 930. In this case, the position data provided by position controller 930 may represent distances between each position mark in a dimension along the length of web 920. In either case, position controller 930 communicates the roll and position information to processing unit 120.

Processing unit 120 processes image streams from acquisition computers 214. Processing unit 120 processes the image data using CNNs 904 trained to detect defects in web 920 based on image data in the image streams Similar to the CNNs 504 discussed above, each of the CNNs may be trained to detect a different type of defect from the other CNNs. Each of the CNNs may be operated in parallel with one another using one or more inference engine(s) 114. The output of each CNN can be data indicative of whether the type of defect detected by the CNN is present in web 920. In some aspects, the output can be probability value that the defect is present, along with a severity of the defect. The output of each CNN can be evaluated in a manner similar to that discussed above with respect to sheet parts. For example, a set of one or more rules may be applied to the outputs to determine how the presence of the defect is to be handled with respect to web 920.

Based the position data produced by position controller 930, processing unit 120 determines the spatial position of each detected defect within the coordinate system of the process line. That is, based on the position data from position controller 930, processing unit 120 determines the x-y and possibly z position for each anomaly within the coordinate system used by the current process line. For example, a coordinate system may be defined such that the x dimension represents a distance across web 920, ay dimension represents a distance along a length of the web, and the z dimension represents a height of the web, which may be based on the number of coatings, materials or other layers previously applied to the web. Moreover, an origin for the x, y, z coordinate system may be defined at a physical location within the process line and is typically associated with an initial feed placement of the web 920. The coordinate system defined for the current process line may not be (and is typically not) the same coordinate system for any previous or subsequent processes applied to web 920.

In any case, processing unit 120 records in database 932 the spatial location of each detected defect with respect to the coordinate system of the process line, this information being referred to herein as local defect information. Other process variables may be stored in database 932 as well. That is, processing unit 120 stores the local defect information for web 920, including roll information for the web 920 and position information for each detected defect, within database 932. The local defect information generated for the current process line may be subsequently spatially registered with local defect information generated by the other process lines for the same web. Further details regarding registration of local defect information may be found in U.S. Pat. No. 7,542,821 entitled "MULTI-UNIT PROCESS SPATIAL SYNCHRONIZATION OF IMAGE INSPECTION SYSTEMS," filed Jul. 26, 2007 which is hereby incorporated by reference herein.

In some aspects, defect information may be stored in database 932. Time series analysis of the defect information may be applied to the defect information and used to determine trends or patterns in a series of defects.

The techniques described in this disclosure may be implemented, at least in part, in hardware, software, firmware or any combination thereof. For example, various aspects of the described techniques may be implemented within at least one processor, including at least one microprocessor, DSP, ASIC, FPGA, and/or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform at least one of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with at least one module and/or unit may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method (e.g., when the instructions are executed). Computer readable storage media may include RAM, read only memory (ROM), programmable read only memory (PROM), EPROM, EEPROM, flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A system for determining a quality category of each of a plurality of sheet parts produced by a manufacturing facility, the system comprising:
   an inspection device comprising at least one image capture device, the at least one image capture device configured to capture image data representative of a sheet part of the plurality of sheet parts;
   a processing unit having one or more processors, the one or more processors to execute instructions that cause the processing unit to:
      provide the image data representative of the sheet part to a first set of a plurality of neural networks, each of the neural networks trained to identify a corresponding defect in the sheet part and output data indicative of the presence of the corresponding defect,
      determine data indicative of a quality category of the sheet part based on the data indicative of the presence of the corresponding defect output by each corresponding neural network, and
      output the data indicative of the quality category of the sheet part; and
   an outlier detection neural network, wherein in response to a determination, based on output of an outlier detection neural network, that the image data representative of the sheet part indicates an outlier defect, the data indicative of the quality category of the sheet part is set to a rework category.

2. The system of claim 1, wherein the processing unit is configured to evaluate a set of one or more rules that use the data indicative of the presence of the corresponding defect output by each corresponding neural network to determine the quality category of the sheet part.

3. The system of claim 1, wherein the processing unit is configured to provide the data indicative of the presence of the corresponding defect output by each corresponding neural network to a second neural network to determine the quality category of the sheet part.

4. The system of claim 1, further comprising a sorter configured to:
   receive the data indicative of the quality category of the sheet part; and
   sort the sheet part based on the data indicative of the quality category of the sheet part.

5. The system of claim 4, wherein the data indicative of the quality category of the sheet part comprises a satisfactory category, a defective category, or a rework category.

6. The system of claim 1, wherein a neural network of the plurality of neural networks outputs one or more image portions each containing image data representative of a potential defect, and wherein a classifier is trained to identify a corresponding defect in the sheet part based on the one or more portions of the image data representative of the potential defect.

7. The system of claim 1, further comprising a machine learning model trained to determine a probability of a defect based on metadata associated with the manufacture of the sheet part, wherein the processing unit is further configured to determine the quality category based on the probability of the defect based on the metadata.

8. The system of claim 7, wherein the metadata comprises one or more of source data, time data, temperature data, position data, process setting data, and sensor measurement data associated with the manufacture of the sheet part.

9. The system of claim 1, further comprising an inference engine configured to receive the data indicative of the presence of the corresponding defect output by each corresponding neural network and one or more process variables and to determine a root cause of the corresponding defect based on the data indicative of the presence of the corresponding defect output by each corresponding neural network and the process variables.

10. The system of claim 1, wherein the processing unit is further configured to output a feedback operation based on the root cause of the corresponding defect.

11. The system of claim 1, wherein the neural networks comprise convolutional neural networks.

12. The system of claim 1, wherein at least one of the neural networks is trained to detect one of particles, scuffs, scratches, dents, bubbles, streaks, or impressions.

13. The system of claim 1, wherein the sheet part comprises an optical film.

14. An inspection device for determining a quality category for a web material produced by a manufacturing facility, the inspection device comprising:
- at least one image capture device, the at least one image capture device configured to capture image data representative of the web material;
- a position controller configured to obtain position data along the web material; and
- a processing unit configured to:
  - provide the image data representative of the web material to each of a plurality of neural networks, each of the neural networks trained to identify a corresponding defect in the web material and output data indicative of the presence of the corresponding defect,
  - determine data indicative of a quality category of the web material based on the data indicative of the presence of the corresponding defect output by each corresponding neural network;
  - set the data indicative of the quality category of the web material to a rework category in response to determining that the image data representative of the web material indicates an outlier defect based on output of an outlier detection neural network; and
  - output the data indicative of the presence of the corresponding defect and the position data in association with the data indicative of the presence of the corresponding defect.

15. A method comprising:
- receiving, from at least one image capture device image data representative of a sheet part of a plurality of sheet parts passing through an inspection device;
- providing the image data representative of the sheet part to a plurality of neural networks, each of the neural networks trained to identify a corresponding defect in the sheet part based on the image data representative of the sheet part and output data indicative of the presence of the corresponding defect,
- determining data indicative of a quality category for the sheet part based on the data indicative of the presence of the corresponding defect output by each corresponding neural network,
- setting the data indicative of the quality category of the sheet part to a rework category in response to determining that the image data representative of the sheet part indicates an outlier defect based on output of an outlier detection neural network, and
- outputting the data indicative of the quality category of the sheet part.

16. The method of claim 15, wherein determining the data indicative of the quality category of the sheet part comprises evaluating a set of one or more rules that use the data indicative of the presence of the corresponding defect output by each corresponding neural network.

17. The method of claim 15, wherein determining the data indicative of the quality category of the sheet part comprises providing the data indicative of the presence of the corresponding defect output by each corresponding neural network to a second neural network.

18. A non-transitory computer-readable medium having stored thereon instructions executable by one or more processors to cause the one or more processors to:
- receive, from at least one image capture device image data representative of a sheet part of a plurality of sheet parts passing through an inspection device;
- provide the image data representative of the sheet part to a plurality of neural networks, each of the neural networks trained to identify a corresponding defect in the sheet part based on the image data representative of the sheet part and output data indicative of the presence of the corresponding defect,
- determine data indicative of a quality category for the sheet part based on the data indicative of the presence of the corresponding defect output by each corresponding neural network,
- set the data indicative of the quality category of the sheet part to a rework category in response to determining that the image data representative of the sheet part indicates an outlier defect based on output of an outlier detection neural network, and
- output the data indicative of the quality category of the sheet part.

19. The non-transitory computer-readable medium of claim 18, wherein the instructions to determine the data indicative of the quality category of the sheet part comprise instructions to evaluate a set of one or more rules that use the data indicative of the presence of the corresponding defect output by each corresponding neural network.

* * * * *